(12) United States Patent
Ito

(10) Patent No.: US 10,381,630 B2
(45) Date of Patent: Aug. 13, 2019

(54) ENERGY STORAGE DEVICE

(71) Applicant: GS Yuasa International Ltd., Kyoto-shi (JP)

(72) Inventor: Shun Ito, Kyoto (JP)

(73) Assignee: GS YUASA INTERNATIONAL LTD., Kyoto-shi, Kyoto (JP)

( * ) Notice: Subject to any disclaimer, the term of this patent is extended or adjusted under 35 U.S.C. 154(b) by 23 days.

(21) Appl. No.: 15/535,893

(22) PCT Filed: Dec. 25, 2015

(86) PCT No.: PCT/JP2015/086302
§ 371 (c)(1),
(2) Date: Jun. 14, 2017

(87) PCT Pub. No.: WO2016/104734
PCT Pub. Date: Jun. 30, 2016

(65) Prior Publication Data
US 2017/0373303 A1 Dec. 28, 2017

(30) Foreign Application Priority Data
Dec. 26, 2014 (JP) .................................. 2014-264605

(51) Int. Cl.
*H01M 2/34* (2006.01)
*H01M 2/06* (2006.01)
(Continued)

(52) U.S. Cl.
CPC ............ *H01M 2/345* (2013.01); *H01G 11/16* (2013.01); *H01G 11/70* (2013.01); *H01G 11/74* (2013.01);
(Continued)

(58) Field of Classification Search
CPC .... H01M 2/345; H01M 2/04; H01M 10/0525; H01M 2/1241; H01M 2/06; H01M 2/26;
(Continued)

(56) References Cited

U.S. PATENT DOCUMENTS 6,117,586 A * 9/2000 Kim ..................... H01M 2/0404
429/175
6,165,637 A 12/2000 Azema
(Continued)

FOREIGN PATENT DOCUMENTS

JP 2000-3702 A 1/2000
JP 2000-11989 A 1/2000
(Continued)

OTHER PUBLICATIONS

International Search Report (ISR) (PCT Form PCT/ISA/210), in PCT/JP2015-086302, dated Mar. 22, 2016.

*Primary Examiner* — Lisa S Park
(74) *Attorney, Agent, or Firm* — McGinn I.P. Law Group, PLLC.

(57) ABSTRACT

An energy storage device includes: a casing 30 having an opening; an energy storage element 20 housed in the casing 30; a lid plate 40 mounted in the opening of the casing 30; a positive electrode terminal member 100 and a negative electrode terminal member 71 integrally fixed to the lid plate 40 in an insulation state by an insulating synthetic resin; a positive electrode current collector 60P configured to electrically connect the energy storage element 20 and the positive electrode terminal member 100 to each other; and a negative electrode current collector 60N configured to electrically connect the energy storage element 20 and the negative electrode terminal member 71 to each other, wherein an easy-to-break portion 65 is formed on at least
(Continued)

either one of the positive electrode terminal member 100 or the positive electrode current collector 60P.

16 Claims, 18 Drawing Sheets

(51) Int. Cl.

| | | |
|---|---|---|
| *H01M 2/26* | (2006.01) | |
| *H01M 10/0525* | (2010.01) | |
| *H01G 11/70* | (2013.01) | |
| *H01G 11/72* | (2013.01) | |
| *H01G 11/74* | (2013.01) | |
| *H01M 2/30* | (2006.01) | |
| *H01G 11/16* | (2013.01) | |
| *H01G 11/76* | (2013.01) | |
| *H01G 11/82* | (2013.01) | |
| *H01G 11/84* | (2013.01) | |
| *H01M 2/04* | (2006.01) | |
| *H01M 2/12* | (2006.01) | |
| *H01M 10/052* | (2010.01) | |

(52) U.S. Cl.
CPC ............ *H01G 11/76* (2013.01); *H01G 11/82* (2013.01); *H01G 11/84* (2013.01); *H01M 2/04* (2013.01); *H01M 2/06* (2013.01); *H01M 2/1241* (2013.01); *H01M 2/26* (2013.01); *H01M 2/30* (2013.01); *H01M 10/0525* (2013.01); *H01M 10/052* (2013.01); *H01M 2200/20* (2013.01); *Y02E 60/13* (2013.01)

(58) Field of Classification Search
CPC .. H01M 2/30; H01M 2200/20; H01M 10/052; H01G 11/76; H01G 11/70; H01G 11/82; H01G 11/84; H01G 11/16; H01G 11/74; Y02E 60/13
See application file for complete search history.

(56) References Cited

U.S. PATENT DOCUMENTS

| | | | |
|---|---|---|---|
| 6,204,635 | B1 | 3/2001 | Sullivan |
| 6,376,120 | B1 | 4/2002 | Azema |
| 2011/0268999 | A1* | 11/2011 | Nagai ................. H01M 2/1241 429/53 |
| 2015/0303441 | A1 | 10/2015 | Takagi |
| 2017/0077483 | A1 | 3/2017 | Hirose et al. |

FOREIGN PATENT DOCUMENTS

| | | |
|---|---|---|
| JP | 2000-113873 A | 4/2000 |
| JP | 2000-113874 A | 4/2000 |
| JP | 2000-235872 A | 8/2000 |
| JP | 2010-55992 A | 3/2010 |
| JP | 2010-272324 A | 12/2010 |
| JP | 2011-14276 A | 1/2011 |
| JP | 2012-230905 A | 11/2012 |
| JP | 2013-225500 A | 10/2013 |
| JP | 2013-242975 A | 12/2013 |
| JP | 2014-41791 A | 3/2014 |
| JP | 2014-154397 A | 8/2014 |
| JP | 2015-162302 A | 9/2015 |
| WO | WO 2013/076831 A1 | 5/2013 |

\* cited by examiner

ENERGY STORAGE DEVICE

TECHNICAL FIELD

A technique disclosed in this specification relates to an energy storage device.

BACKGROUND ART

Conventionally, as a nonaqueous electrolyte secondary battery, there has been known a nonaqueous electrolyte secondary battery described in JP-A-2012-230905, for example. In this nonaqueous electrolyte secondary battery, an energy storage element is housed in the inside of an outer can. The outer can has an opening and the opening is sealed by a sealing plate. External electrode terminals are mounted outside the sealing plate, and project outward from the sealing plate. Current collecting tab members are electrically connected to the energy storage element. A diaphragm is disposed on a battery inner side with respect to the sealing plate and on a battery outer side with respect to the current collecting tab members. The diaphragms are electrically connected to the external electrode terminals.

The external electrode terminal and the diaphragm are electrically connected to each other by a sealing body lead. A first insulating member (insulating plate) is interposed between the sealing plate and a sealing body lead. A second insulating member (current collecting tab holder) is interposed between the diaphragm and the current collecting tab member.

The second insulating member has a through hole, and the diaphragm and the current collecting tab member are connected to each other through the through hole.

The diaphragm is configured such that when an internal pressure of a battery is increased, the diaphragm is deformed toward the battery outer side. Due to deformation of the diaphragm, the connection between the diaphragm and the current collecting tab member breaks so that an electric current which flows between the diaphragm and the current collecting tab member is cut off.

PRIOR ART DOCUMENT

Patent Document

Patent Document 1: JP-A-2012-230905

SUMMARY OF THE INVENTION

Problems to be Solved by the Invention

In the nonaqueous electrolyte secondary battery according to the above-mentioned technique, the diaphragm and the external electrode terminal are connected to each other by the sealing body lead which is provided as a member separated from the diaphragm and the external electrode terminal. In this manner, the nonaqueous electrolyte secondary battery according to the prior art has a drawback that the number of parts is increased.

It is an object of a technique disclosed in this specification to provide an energy storage device in which the number of parts is reduced.

Means for Solving the Problems

An energy storage device disclosed in this specification includes: a casing having an opening; an energy storage element housed in the casing; a lid plate mounted in the opening of the casing; a terminal member integrally fixed to the lid plate in an insulation state by an insulating synthetic resin; and a current collector configured to electrically connect the energy storage element and the terminal member to each other, wherein an easy-to-break portion is formed on at least either one of the terminal member or the current collector.

Advantages of the Invention

An energy storage device disclosed in this specification can reduce the number of parts.

MODE FOR CARRYING OUT THE INVENTION

Summary of Embodiment

Figure 1:
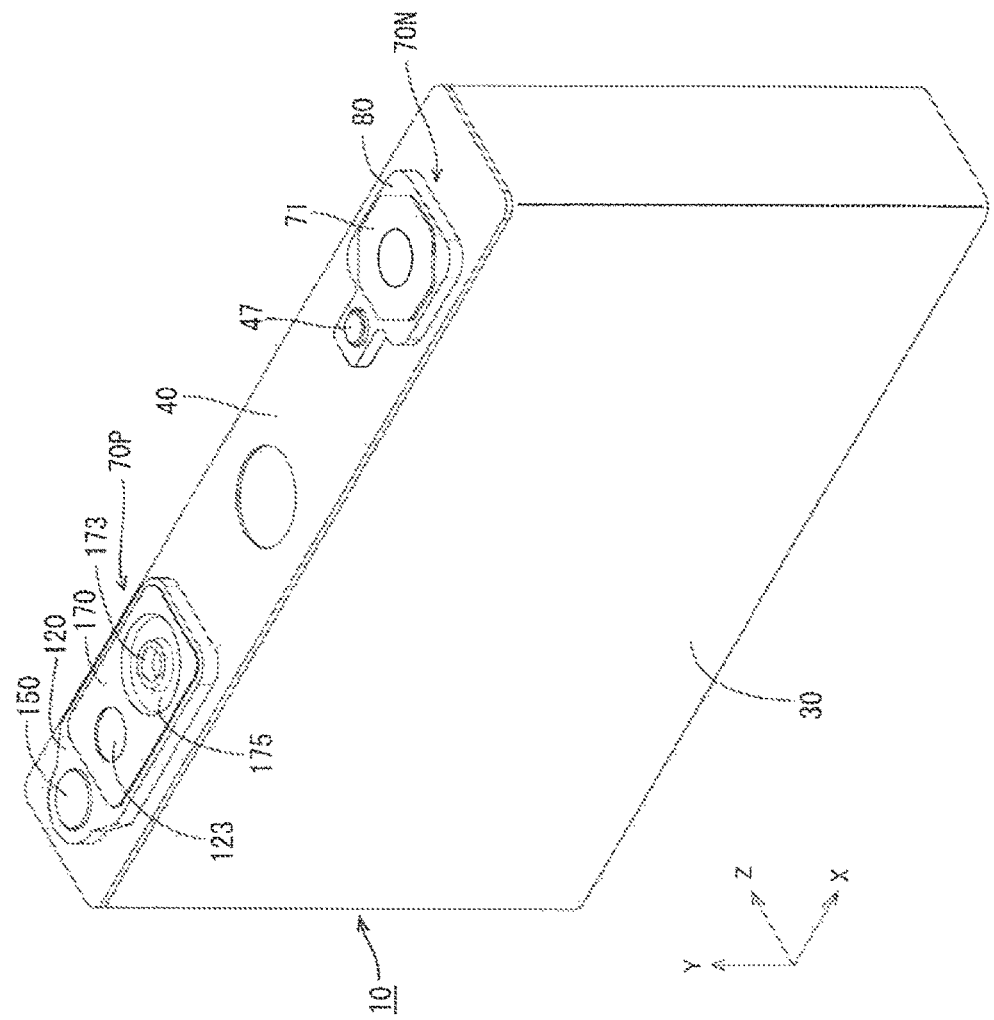
FIG. 1 is a perspective view of a battery according to an embodiment 1.

The summary of an energy storage device according to this embodiment is described. The energy storage device of this embodiment includes: a casing having an opening; an energy storage element housed in the casing; a lid plate mounted in the opening of the casing; a terminal member integrally fixed to the lid plate in an insulation state by an insulating synthetic resin; and a current collector configured to electrically connect the energy storage element and the terminal member to each other, wherein an easy-to-break portion is formed on at least either one of the terminal member or the current collector.

With the above-mentioned configuration, the connection between the terminal member and the current collector is disconnected due to breaking of the easy-to-break portion and hence, an electric current which flows between the terminal member and the current collector can be cut off. Further, the easy-to-break portion is disposed between the terminal member and the current collector and hence, the number of parts can be reduced.

The terminal member is integrally fixed to the lid plate by the insulating synthetic resin and hence, the lid plate and the terminal member can be integrally formed with each other in an insulation state using a simple technique called integral molding.

In the energy storage device of this embodiment, a first insulating member made of an insulating synthetic resin is interposed between the lid plate and the terminal member, and an inserting portion is formed on the terminal member, the inserting portion being inserted into the inside of the first insulating member. With such a configuration, the terminal member can be firmly fixed to the first insulating member by inserting the inserting portion into the first insulating member.

In the energy storage device of this embodiment, the terminal member includes; a metal-made reverse film which is deformed when a pressure in the casing is increased; and an external connecting portion electrically connected to an external circuit, and wherein the easy-to-break portion is formed on the current collector such that the easy-to-break portion breaks due to deformation of the reverse film. With such a configuration, when an internal pressure of the casing is increased, the reverse film is deformed so that the easy-to-break portion breaks, and whereby the connection between the terminal member and the current collector is disconnected. Accordingly, an electric current which flows between the terminal member and the current collector can be cut off.

In the energy storage device of this embodiment, the current collector includes: a base portion disposed on a lower surface of the lid plate; and a projecting portion disposed on the base portion, projecting toward the reverse film of the terminal member, and connected to the reverse film, and wherein the easy-to-break portion forms a part of the projecting portion, With such a configuration, the reverse film and the current collector can be easily connected to each other.

In the energy storage device of this embodiment, a first insulating member is interposed between the lid plate and the terminal member, and a lower surface of the reverse film is positioned above a lower surface of the first insulating member or the lid plate. With such a configuration, a volume which the energy storage element can occupy in an inner space of the energy storage device can be increased. Accordingly, a battery capacity of the energy storage device can be increased.

In the energy storage device of this embodiment, the reverse film has a disk shape, and a diameter size of the reverse film is set smaller than a diameter size of a hole edge portion of the first through hole or the second through hole. With such a configuration, the reverse film can be disposed in the vicinity of the first through hole or the second through hole in a height direction (vertical direction) of the energy storage device. Accordingly, a volume which the energy storage element can occupy in the inner space of the energy storage device (particularly in a height direction) can be increased and hence, a volume of the energy storage device can be increased. The diameter size of the reverse film is smaller than the diameter size of the hole edge portion of the first through hole or the second through hole and hence, the reverse film can be disposed from an outer surface side of the lid plate. As a result, the degree of freedom in steps of assembling the reverse film to the outer plate or the lid plate can be increased.

In the energy storage device of this embodiment, a second insulating member made of an insulating synthetic resin is disposed between the external connecting portion of the terminal member and the lid plate. With such a configuration, a diameter size of a hole edge portion of the second through hole formed in the lid plate can be made small. Accordingly, strength of the lid plate can be enhanced. The external connecting portion can be easily disposed above the lid plate. It is unnecessary to make a die for forming an outer plate by insert molding have a complicated shape.

In the energy storage device of this embodiment, the base portion is fixed to the lid plate. With such a configuration, it is possible to prevent a load of the energy storage element from being concentrated on a connecting portion between the reverse film and the current collector.

In the energy storage device of this embodiment, the energy storage device includes an external terminal connected to the external connecting portion of the terminal member. With such a configuration, a shape of the external terminal can be designed as desired and hence, the degree of freedom in designing a structure for connecting the energy storage device and the external circuit to each other can be enhanced.

An energy storage device of this embodiment includes: a casing having an opening; an energy storage element housed in the casing; a lid plate mounted in the opening of the casing; a terminal member integrally fixed to the lid plate in an insulation state by an insulating synthetic resin; and a current collector configured to electrically connect the energy storage element and the terminal member to each other, wherein the terminal member includes: a metal-made reverse film which is deformed when a pressure in the casing is increased; and an external connecting portion electrically connected to an external circuit, wherein the current collector includes an easy-to-break portion, and the easy-to-break portion is configured to be broken due to deformation of the reverse film, and a thickness of the external connecting portion is set larger than a thickness of the reverse film in a reversing direction in which the reverse film is reversed due to deformation of the reverse film. With such a configuration, in performing insert molding of the reverse film and the lid plate by an insulating synthetic resin, the external connecting portion can be used as a portion to be held which is held by a die. Accordingly, it is unnecessary to hold the reverse film having a relatively small wall thickness by the die and hence, it is possible to suppress the occurrence of a drawback such as deformation of the reverse film at the time of performing insert molding.

A method of manufacturing an energy storage device according to this embodiment is a method of manufacturing an energy storage device which includes: a casing having an opening; an energy storage element housed in the casing; a lid plate mounted in the opening of the casing; a terminal member fixed to the lid plate in an insulation state; and a current collector configured to electrically connect the energy storage element and the terminal member to each other; and an easy-to-break portion is formed on at least either one of the terminal member or the current collector, wherein the method includes a step of forming the terminal member integrally with the lid plate by insert molding using an insulating synthetic resin.

In the method of manufacturing an energy storage device according to this embodiment, the terminal member is formed by insert molding in a state where the terminal member is sandwiched between a first die and a second die, the terminal member includes: a first portion to be held which is held by the first die; and a second portion to be held which is held by the second die.

In the method of manufacturing an energy storage device according to this embodiment, the terminal member includes: a metal-made reverse film configured to be deformed when a pressure in the casing is increased; and an external connecting portion electrically connected to an external circuit, wherein the easy-to-break portion is formed on the current collector such that the easy-to-break portion breaks due to deformation of the reverse film, and wherein the method includes a step of welding the reverse film and the current collector to each other.

In the method of manufacturing an energy storage device according to this embodiment, the terminal member includes an external connecting portion electrically connected to an external circuit, and wherein the method includes a step of welding the external connecting portion of the terminal member and an external terminal to each other.

Embodiment 1

Hereinafter, a battery 10 which is an embodiment 1 of an energy storage device is described with reference to FIG. 1 to FIG. 11.
1. Entire Structure of Battery 10
(Battery 10)

Figure 2:
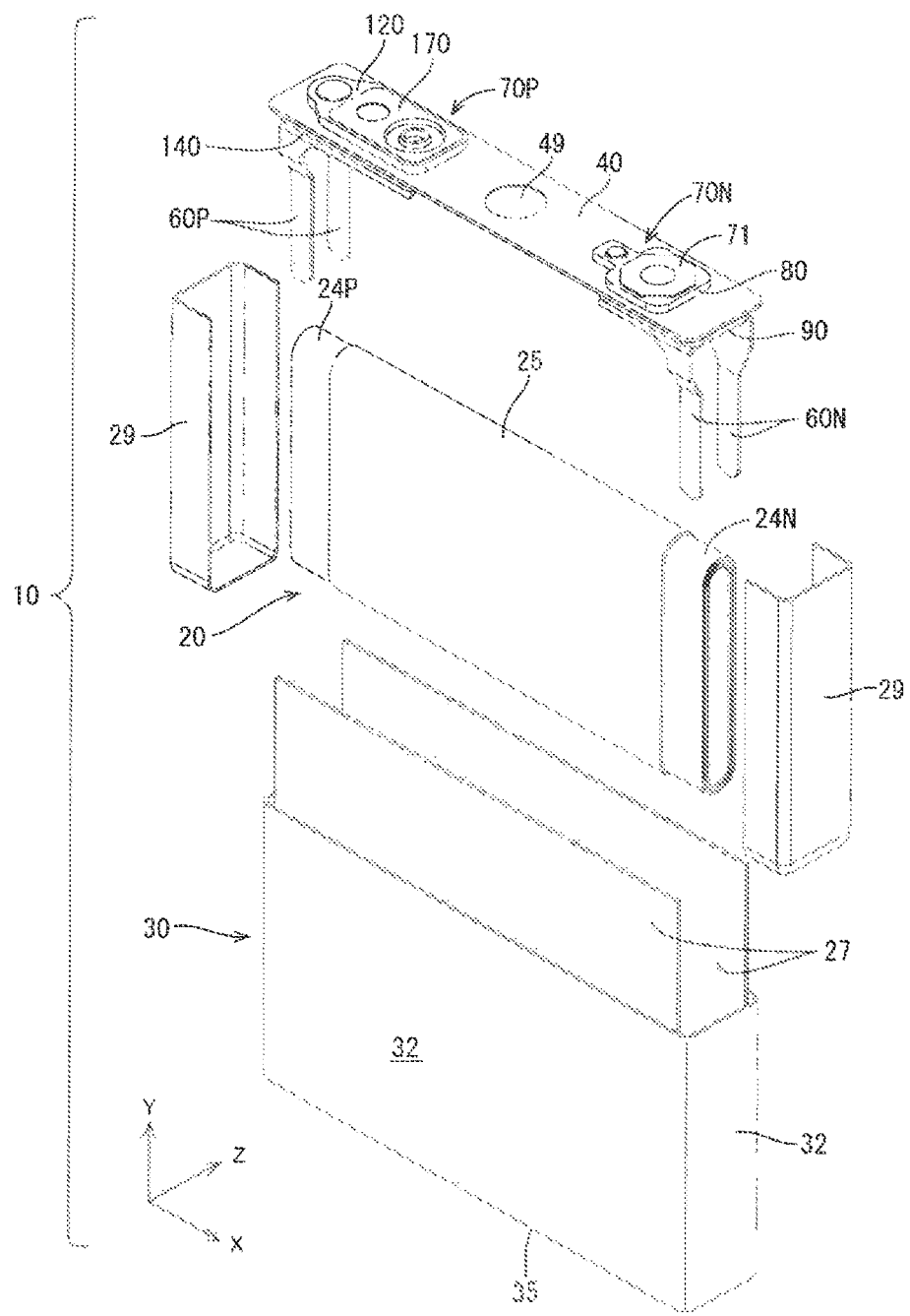
FIG. 2 is an exploded perspective view of the battery.

A battery 10 is a nonaqueous electrolyte secondary battery. To be more specific, the battery 10 is a lithium ion secondary battery. As shown in FIG. 1 and FIG. 2, the battery 10 includes: an energy storage element 20; a casing 30; a lid plate 40; a positive electrode current collector 60P; a negative electrode current collector 60N a positive electrode terminal portion 70P; and a negative electrode terminal portion 70N. In the description made hereinafter, a direction along which the positive electrode terminal portion 70P and the negative electrode terminal portion 70N are arranged is assumed as an X direction, a height direction of the casing 30 is assumed as a Y direction, and a depth direction of the casing 30 is assumed as a Z direction.

The casing 30 is a metal member made of an aluminum alloy, steel or the like. As shown in FIG. 1 and FIG. 2, the casing 30 is a bottomed prismatic cylindrical body having long sides extending in the X direction and short sides extending in the Z direction. The casing 30 includes four outer peripheral walls 32 and a bottom surface wall 35.

Figure 4:
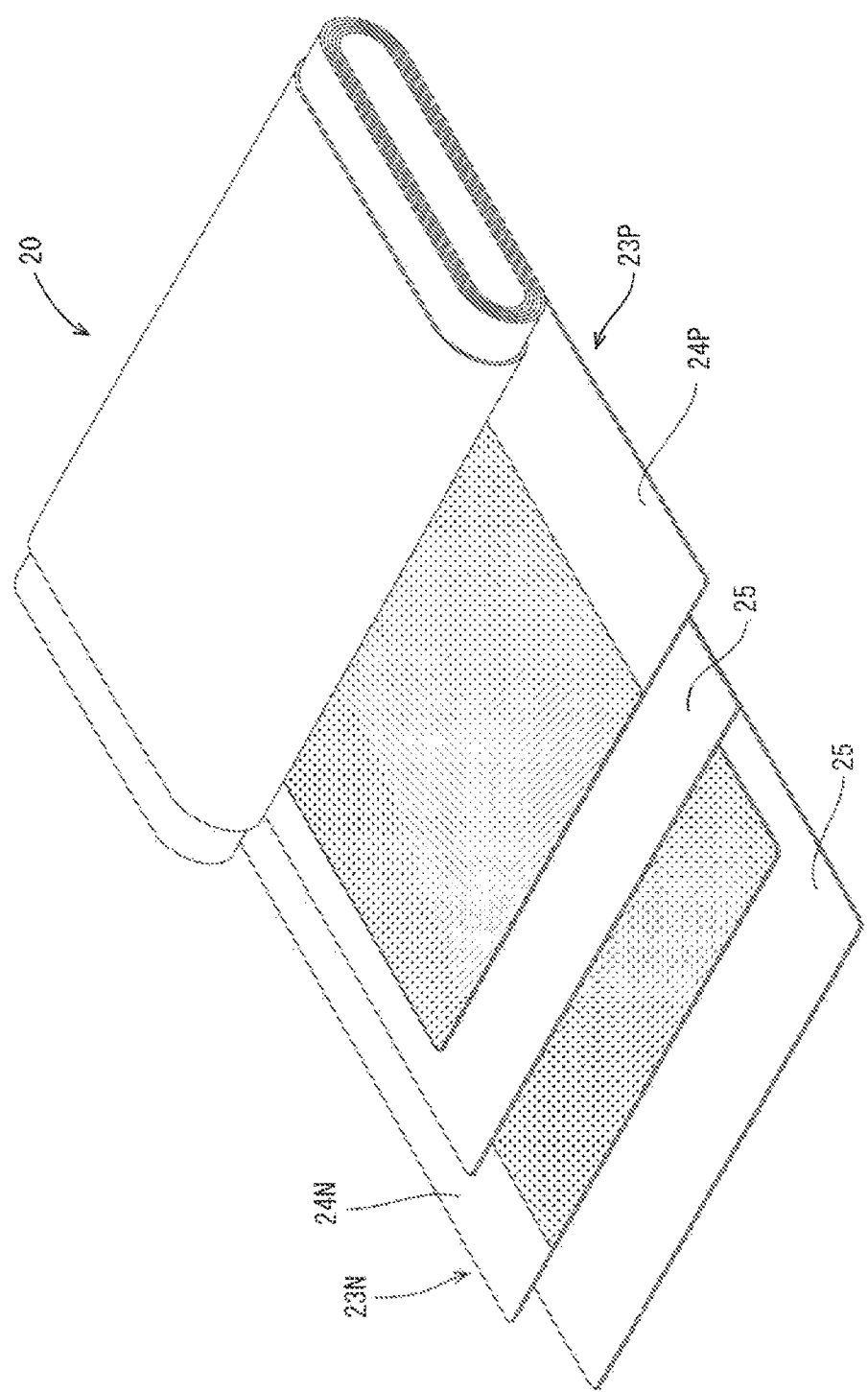
FIG. 4 is a perspective view of an energy storage element.

As shown in FIG. 4, the energy storage element 20 includes a positive electrode sheet 23P, a negative electrode sheet 23N, and separators 25. The positive electrode sheet 23P is a sheet where a positive active material is carried on a surface of an aluminum foil. On an edge portion of the positive electrode sheet 23P on one side, a positive electrode current collector foil 24P where an aluminum foil is exposed is formed. The negative electrode sheet 23N is a sheet where a negative active material is carried on a surface of a copper foil. On an edge portion of the negative electrode sheet 23N on the other side, a negative electrode current collector foil 24N where a copper foil is exposed is formed.

The energy storage element 20 is formed by winding the positive electrode sheet 23P and the negative electrode sheet 23N in an elongated cylindrical shape while displacing the positions of the positive electrode sheet 23P and the negative electrode sheet 23N relative to each other in different directions in the lateral direction in a state where the separator 25 is sandwiched therebetween. The energy storage element 20 is housed in the casing 30 in a state where the energy storage element 20 is covered by insulating covers 27. The battery 10 also includes a pair of left and right side insulating covers 29 besides the insulating covers 27 so that the battery 10 has the structure where the positive and negative electrode current collector foils 24P, 24N disposed on both sides of the energy storage element 20 are covered by the pair of left and right side insulating covers 29.

Figure 3:
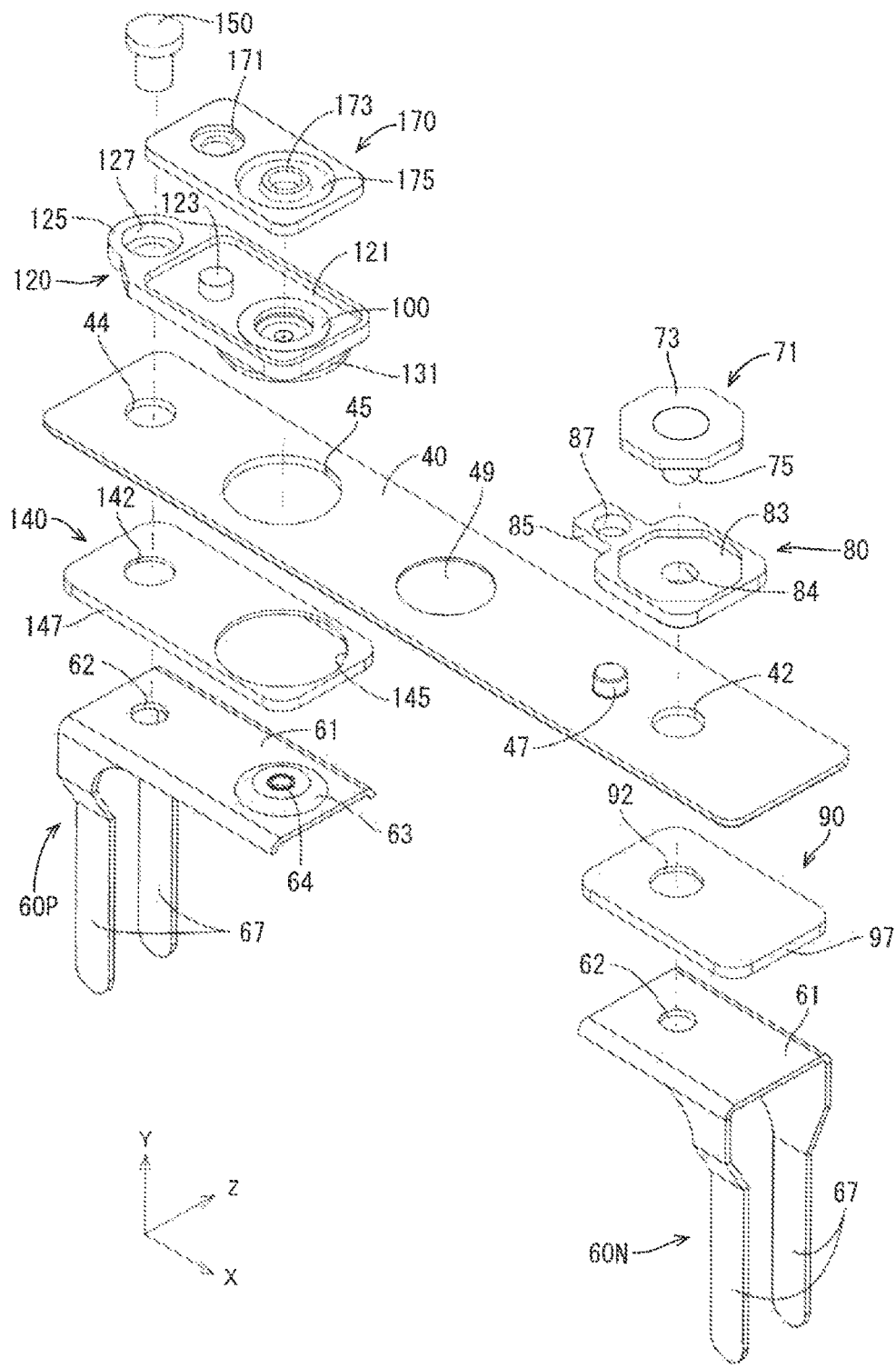
FIG. 3 is an exploded perspective view of a lid plate, a positive electrode terminal portion, and a negative electrode terminal portion.

The lid plate 40 is a metal member made of an aluminum alloy, steel or the like and, as shown in FIG. 1 to FIG. 3, is a rectangular plate member extending in the X direction. The lid plate 40 has a size which corresponds to a size of an opening of the casing 30, and is mounted in the opening of the casing 30 for sealing the opening of the casing 30. The lid plate 40 has three through holes 42, 44, 45 and a positioning protrusion 47. The positioning protrusion 47 projects upward from an upper surface of the lid plate 40. The lid plate 40 also has a gas release vent 49. When an internal pressure of a battery becomes a predetermined value or more, the gas release vent 49 breaks so that a gas is discharged through the gas release vent 49. Accordingly, the gas release vent 49 has a function of lowering an internal pressure of a battery.

The positive electrode current collector 60P and the positive electrode terminal portion 70P form a pair, and the negative electrode current collector 60N and the negative electrode terminal portion 70N form a pair. The pair of positive electrode current collector 60P and the positive electrode terminal portion 70P and the pair of the negative electrode current collector 60N and the negative electrode terminal portion 70N are disposed on both sides of the lid plate 40 in the X direction respectively separately from each other. In this embodiment, the positive electrode current collector 60P and the positive electrode terminal portion 70P are disposed on the left side and away from a viewer in FIG. 1 and FIG. 2, and the negative electrode current collector 60N and the negative electrode terminal portion 70N are disposed on the right side and close to the viewer in FIG. 1 and FIG. 2.

(Negative Electrode Terminal Portion 70N)

As shown in FIG. 1 to FIG. 3, the negative electrode terminal portion 70N includes a negative electrode terminal member 71, an outer plate 80, and an inner plate 90.

The outer plate 80 is made of an insulating material such as a synthetic resin, and has a flat plate shape with a size larger than a size of the negative electrode terminal member 71. On an upper surface of the outer plate 80, a hexagonal mounting portion 83 which conforms to a profile shape of the negative electrode terminal member 71 is formed. The outer plate 80 is disposed on an upper surface side of the lid plate 40, and provides insulation between the lid plate 40 and the negative electrode terminal member 71.

A positioning portion 85 having a positioning hole 87 is formed on an outer peripheral portion of the outer plate 80. By making the positioning protrusion 47 of the lid plate 40 engage with the positioning hole 87 by fitting engagement, the outer plate 80 can be positioned with respect to the lid plate 40.

The inner plate 90 is made of an insulating material such as a synthetic resin, and has a flat plate shape with a size larger than a size of a base portion 61 of the negative electrode current collector 60N. The inner plate 90 is disposed on a lower surface 40A of the lid plate 40, and provides insulation between the lid plate 40 and the negative electrode current collector 60N. A flange 97 is formed on an outer periphery of the inner plate 90. The flange 97 extends downward, and surrounds an outer periphery of the base portion of the negative electrode current collector 60N.

The negative electrode terminal member 71 is a conductive metal member. The negative electrode terminal member 71 includes: a head portion 73 which is made to engage with the mounting portion 83 formed on the outer plate 80 by fitting engagement; and a shaft portion 75 which extends downward from a lower surface of the head portion 73. The head portion 73 has a hexagonal shape as viewed in a top plan view. The shaft portion 75 of the negative electrode terminal member 71 passes through a through hole 84 formed in the outer plate 80, a through hole 42 formed in the lid plate 40, a through hole 92 formed in the inner plate 90, and a through hole 62 formed in the base portion 61 of the negative electrode current collector 60N in this order. The negative electrode terminal member 71 is fixed to the upper surface of the lid plate 40 by caulking a distal end of the shaft portion 75 with the outer plate 80 interposed between the negative electrode terminal member 71 and the lid plate 40.

The negative electrode current collector 60N is a conductive metal member (made of copper, for example), and includes a base portion 61 having a flat plate shape and a pair of opposedly facing walls 67. The negative electrode current collector 60N is fixed to a back surface side of the lid plate 40. To be more specific, the base portion 61 is fixed to the lower surface 40A of the lid plate 40 with the inner plate 90 interposed between the base portion 61 and the lid plate 40.

The pair of opposedly facing walls 67 extends downward parallel to each other from side edge portions of the base portion 61 fixed to the lower surface 40A of the lid plate 40. The pair of opposedly facing walls 67 oppositely faces each other in the Z direction, and holds the negative electrode current collector foil 24N formed on a side edge portion of the negative electrode sheet 23N by clamping the negative electrode current collector foil 24N from both sides in the Z direction. With such a configuration, the negative electrode current collector foil 24N of the energy storage element 20 and the negative electrode current collector 60N are electrically connected with each other.

(Positive Electrode Terminal Portion 70P)

As shown in FIG. 1 to FIG. 3, the positive electrode terminal portion 70P includes: a positive electrode terminal member 100; an outer plate 120 (one example of a first insulating member); an inner plate 140; a rivet 150; and a positive electrode external terminal 170.

The outer plate 120 is made of an insulating material such as a synthetic resin, and has a flat plate shape with a size larger than a size of the positive electrode external terminal 170. On an upper surface of the outer plate 120, a quadrangular mounting portion 121 which conforms to a profile shape of the positive electrode external terminal 170 is formed. A mounting portion 125 having a through hole 127 is formed on an outer peripheral portion of the outer plate 120.

The outer plate 120 is disposed on the upper surface side of the lid plate 40, and provides insulation between the lid plate 40 and the positive electrode external terminal 170. The outer plate 120 also includes a cylindrical portion 131 which corresponds to the second through hole 45 formed in the lid plate 40 (see FIG. 3 and FIG. 6). The cylindrical portion 131 has a circular cylindrical shape, and is made to engage with the second through hole 45 formed in the lid plate 40 by fitting engagement. The cylindrical portion 131 extends downward and passes through the second through hole 45 formed in the lid plate 40, and a folded back portion 135 is formed on a lower portion of an outer surface of the cylindrical portion 131. The folded back portion 135 surrounds a hole edge of the second through hole 45 formed in the lid plate 40 and is bent outward along the lower surface 40A of the lid plate 40. A first through hole 132 which penetrates the outer plate 120 is formed in the cylindrical portion 131 in the vertical direction. The first through hole 132 formed in the outer plate 120 and the second through hole 45 formed in the lid plate 40 are disposed coaxially with each other.

Figure 5:
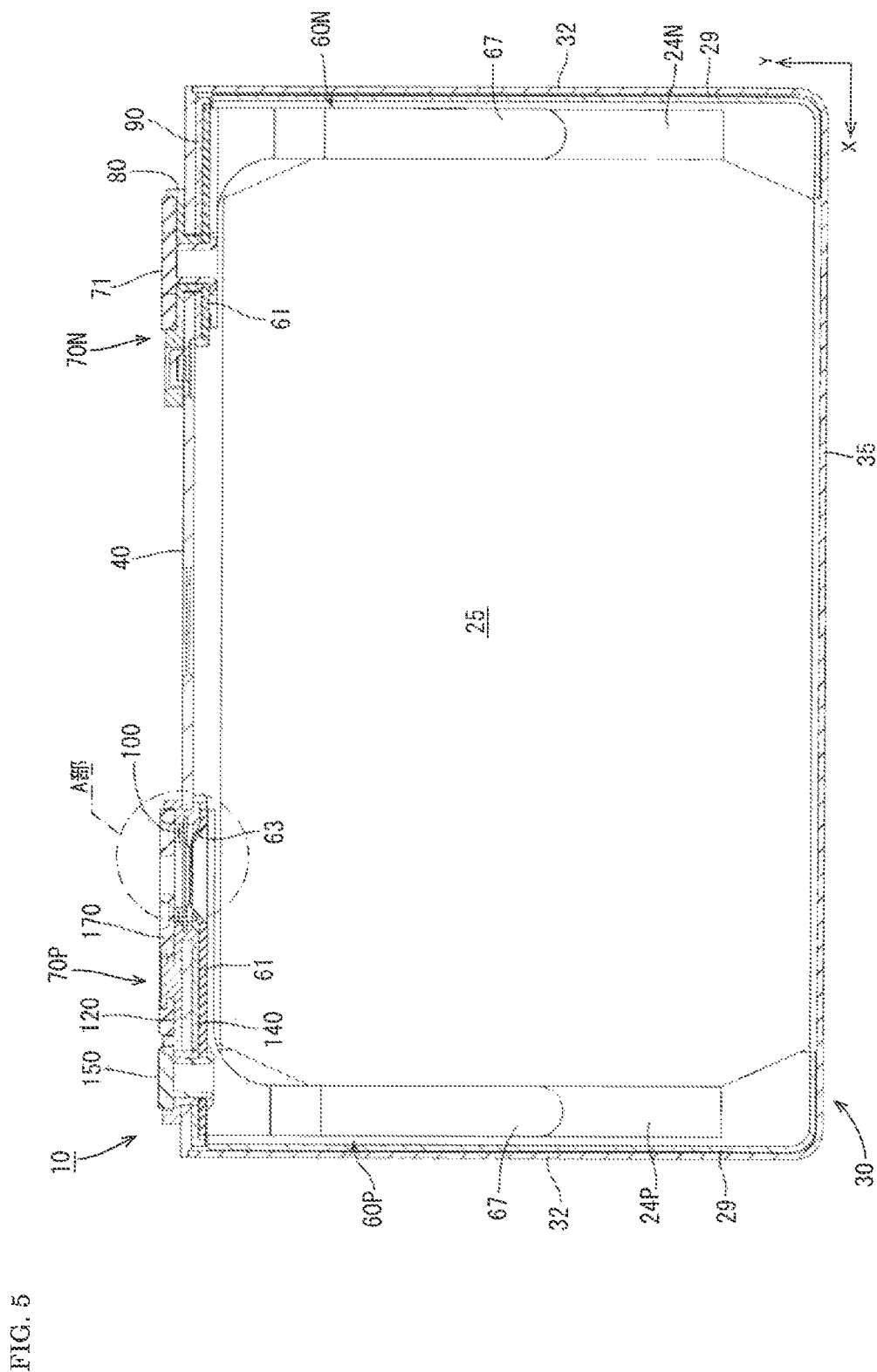
FIG. 5 is a longitudinal cross-sectional view of the battery.
Figure 6:
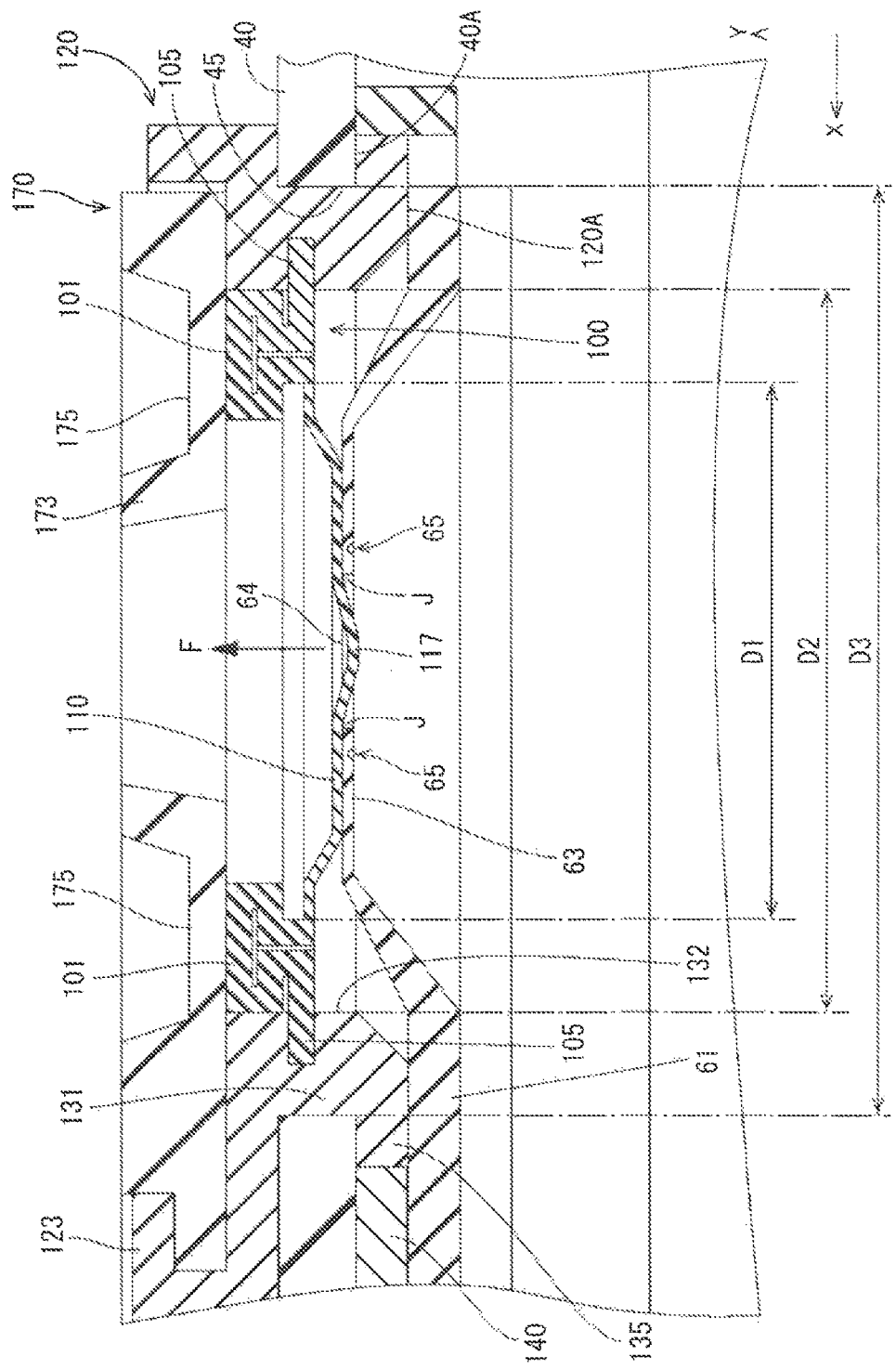
FIG. 6 is a view showing a portion A in FIG. 5 in an enlarged manner.

The positive electrode terminal member 100 is a conductive metal member (made of aluminum, for example). As shown in FIG. 5 and FIG. 6, the positive electrode terminal member 100 is disposed in the first through hole 132 of the cylindrical portion 131 which is made to engage with the second through hole 45 formed in the lid plate 40 by fitting engagement.

Figure 7:
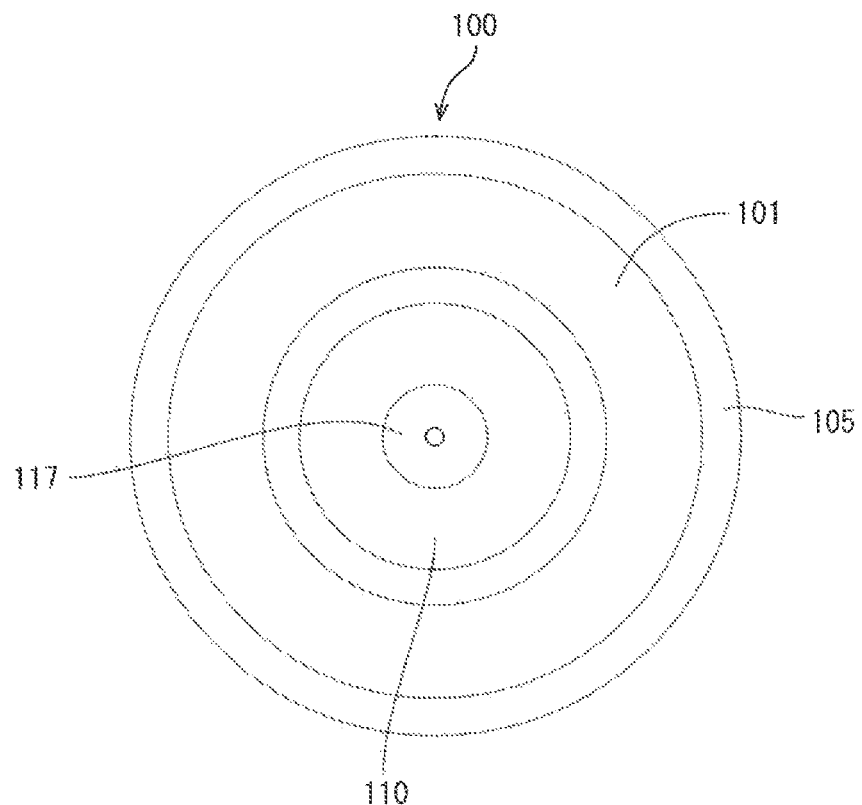
FIG. 7 is a plan view of a positive electrode terminal member.
Figure 8:
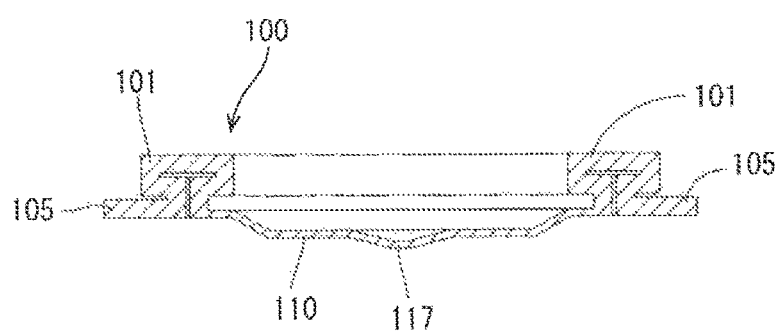
FIG. 8 is a cross-sectional view of the positive electrode terminal member.

As shown in FIG. 7 and FIG. 8, the positive electrode terminal member 100 includes: an external connecting portion 101 having a ring shape; a reverse film 110; and an inserting portion 105. The reverse film 110 is a disk-shaped thin plate, and is arranged inside the external connecting portion 101. The reverse film 110 is integrally formed with the external connecting portion 101, and projects downward from a lower surface of the external connecting portion 101. The external connecting portion 101 is formed by bending a metal plate member having a wall thickness slightly larger than a wall thickness of the reverse film 110. Accordingly, by a simple technique of bending a metal plate member having a wall thickness slightly larger than the wall thickness of the reverse film 110, the external connecting portion 101 having a thickness larger than a thickness of the reverse film 110 can be formed.

The inserting portion 105 projects outward from a lower portion of an outer peripheral surface of the external connecting portion 101. The inserting portion 105 has a plate shape, and is formed over the entire circumference of the external connecting portion 101. The inserting portion 105 is inserted into the cylindrical portion 131 of the outer plate 120.

Figure 9:
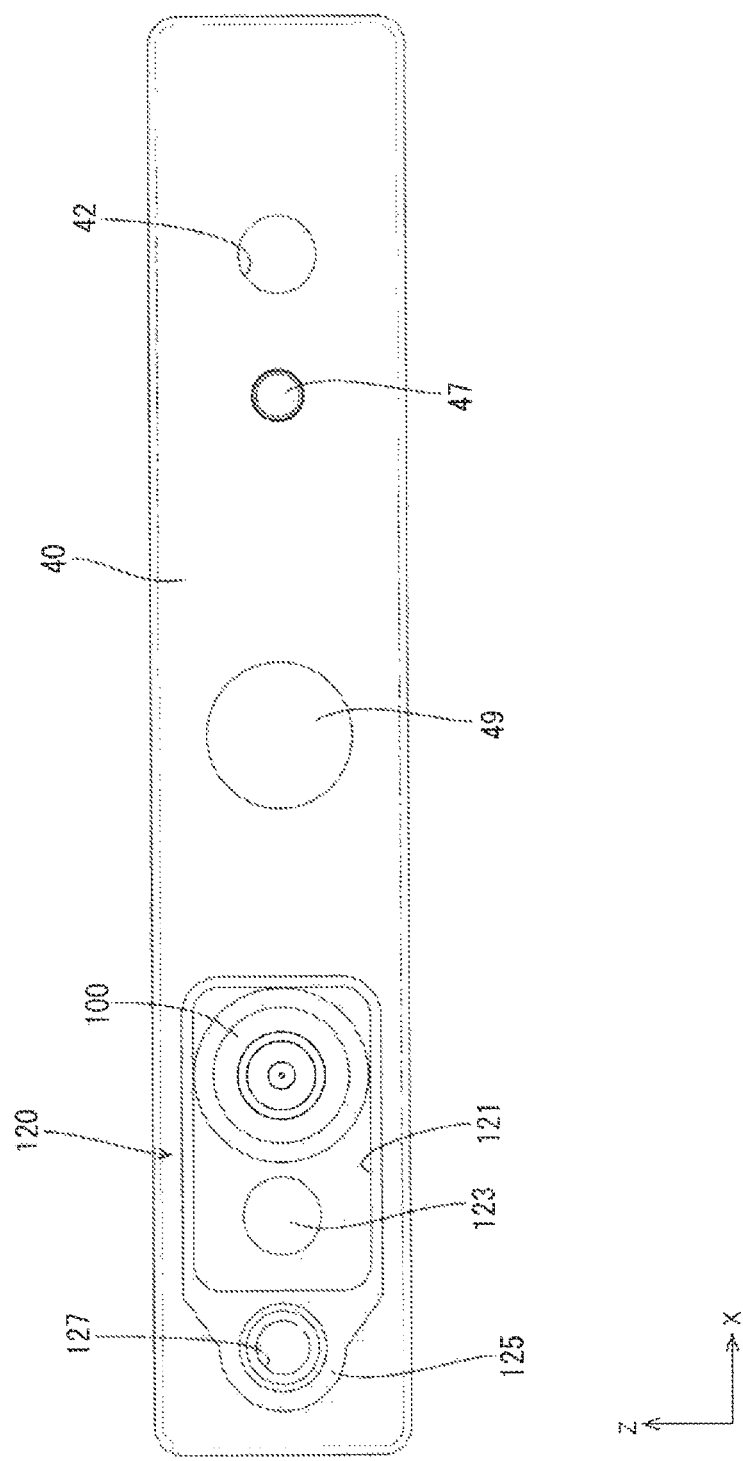
FIG. 9 is a plan view of the lid plate with which the positive electrode terminal. member is integrally formed using an outer plate made of a synthetic resin.
Figure 10:
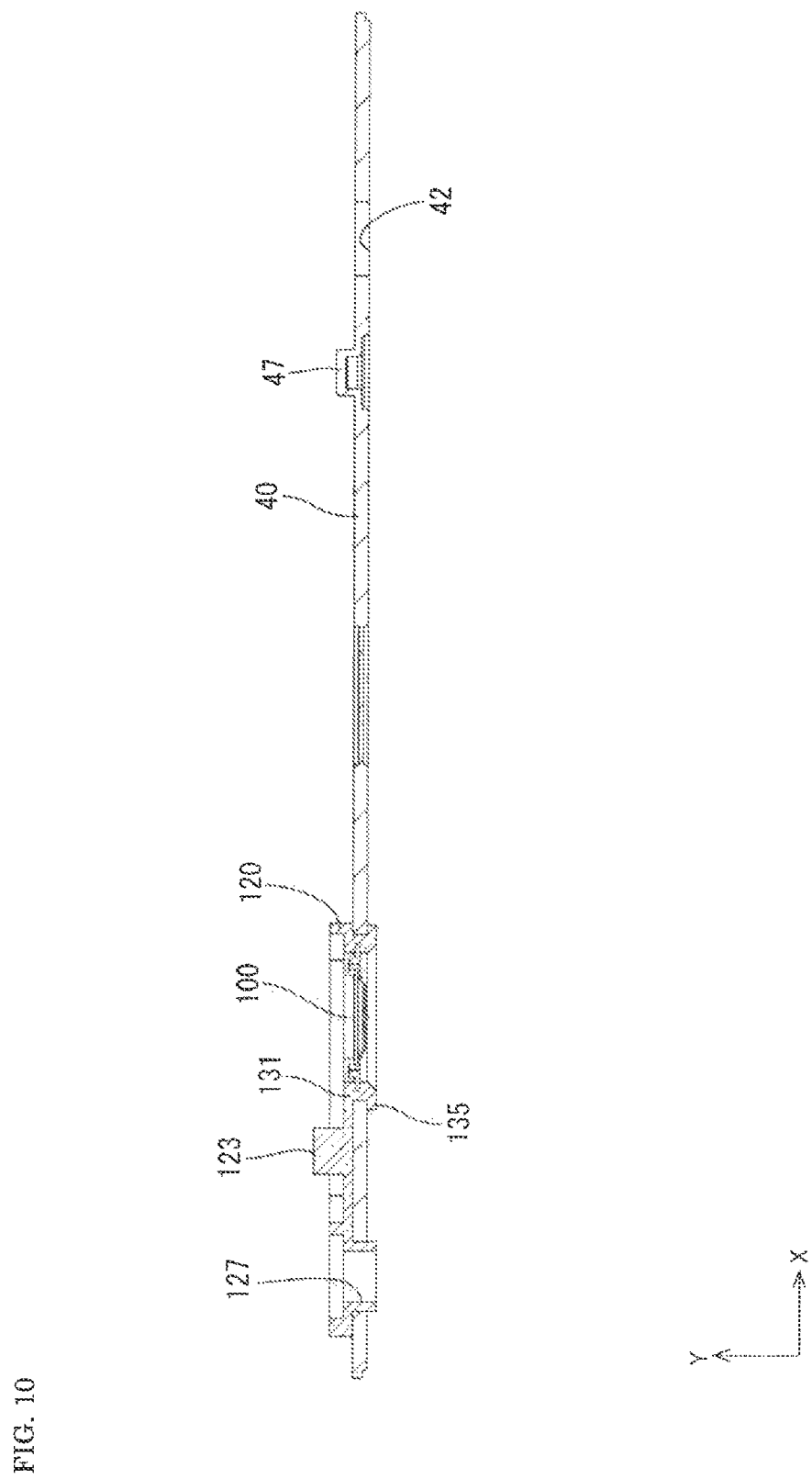
FIG. 10 is a cross-sectional view of the lid plate with which the positive electrode terminal member is integrally formed using the outer plate made of a synthetic resin.

As shown in FIG. 9 and FIG. 10, the positive electrode terminal member 100 is integrally formed with the lid plate 40 by the outer plate 120. That is, the outer plate 120 is formed by molding by filling a resin into a die into which the lid plate 40 and the positive electrode terminal member 100 are inserted so that these three members 40, 100, 120 are formed as an integral body. As described above, by forming these three members 40, 100, 120 as an integral body, a gap formed between the second through hole 45 formed in the lid plate 40 and the positive electrode terminal member 100 is filled with a resin without forming a gap and hence, it is possible to maintain a gas tight state between the lid plate 40 and the positive electrode terminal member 100.

As shown in FIG. 3, the positive electrode external terminal 170 is a conductive metal member (made of aluminum, for example), and has a flat plate shape. The positive electrode external terminal 170 is disposed on the mounting portion 121 formed on the outer plate 120 disposed on the upper surface side of the lid plate 40. An engaging hole 171 is formed in the positive electrode external terminal 170. On the other hand, a rib 123 is formed on the mounting portion 121 of the outer plate 120. The rib 123 passes through the engaging hole 171. By thermally caulking a distal end of the rib, the positive electrode external terminal 170 is fixed onto the outer plate 120 mounted on the upper surface of the lid plate 40.

The positive electrode external terminal 170 also includes: a cylindrical projecting portion 173 which projects upward; and a portion to be connected 175 which is disposed on an outer peripheral side of the projecting portion 173. As shown in FIG. 8, the portion to be connected 175 has a circular annular shape which surrounds the periphery of the projecting portion 173, and has a small plate thickness compared to other portions of the positive electrode external terminal 170. The portion to be connected 175 is disposed on an upper surface of the external connecting portion 101 of the positive electrode terminal member 100 in an overlapping manner. By connecting the portion to be connected 175 and the external connecting portion 101 by laser welding, the positive electrode external terminal 170 is joined to the positive electrode terminal member 100.

The inner plate 140 is made of an insulating material such as a synthetic resin, and has a flat plate shape with a size larger than a size of a base portion 61 of the positive electrode current collector 60P. The inner plate 140 is a member (third insulating member) which is disposed on the lower surface 40A of the lid plate 40, and provides insulation between the lid plate 40 and the base portion 61 of the positive electrode current collector 60P. A flange 147 is formed on an outer periphery of the inner plate 140. The flange 147 extends downward, and surrounds an outer periphery of the base portion 61 of the positive electrode current collector 60P. An escape hole 145 is formed in the inner plate 140. The folded back portion 135 of the outer plate 120 is designed to be positioned inside the escape hole 145 so that interference between the outer plate 120 and the inner plate 140 is prevented.

The positive electrode current collector 60P is a conductive metal member (made of aluminum, for example), and includes: the base portion 61 having a flat plate shape; and a pair of oppositely facing walls 67. The positive electrode current collector 60P is fixed to the lower surface 40A side of the lid plate 40. To be more specific, the base portion 61 of the positive electrode current collector 60P is disposed on the lower surface 40A side of the lid plate 40 with the inner plate 140 interposed between the base portion 61 and the lid plate 40.

As shown in FIG. 3, the rivet 150 passes through the through hole 127 formed in the outer plate 120, the through hole 44 formed in the lid plate 40, the through hole 142 formed in the inner plate 140, and the through hole 62 formed in the base portion 61 of the positive electrode current collector 60P in this order, and a distal end of the rivet 150 is caulked. With such a configuration, the base portion 61 of the positive electrode current collector 60P is fixed to the lower surface 40A of the lid plate 40 with the inner plate 140 interposed between the positive electrode current collector 60P and the lid plate 40.

The pair of oppositely facing walls 67 extends downward parallel to each other from a side edge portion of the base portion 61 fixed to the lower surface 40A of the lid plate 40. The pair of oppositely facing walls 67 oppositely face each other in the Z direction, and holds the positive electrode current collector foil 24P formed on a side edge portion of the positive electrode sheet 23P by clamping the positive electrode current collector foil 24P from both sides in the Z direction. With such a configuration, the positive electrode current collector foil 24P of the energy storage element 20 and the positive electrode current collector 60P are electrically connected with each other.

The base portion 61 of the positive electrode current collector 60P also includes a projecting portion 63. The projecting portion 63 has a dish shape, and projects upward from the upper surface of the base portion 61. An upper surface of the projecting portion 63 has a flat planar shape and, as shown in FIG. 6, is brought into contact with the reverse film 110 of the positive electrode terminal member 100 from below in the second through hole 45 formed in the lid plate 40.

A connection hole 64 is formed in a center portion of the projecting portion 63. On the other hand, a boss 117 is formed at a center portion of the reverse film 110. The boss 117 projects downward, and enters the connection hole 64 while being in contact with a hole edge of the connection hole 64 over the entire circumference of the connection hole 64. The reverse film 110 of the positive electrode terminal member 100 and the projecting portion 63 of the positive electrode current collector 60P are joined to each other by welding the boss 117 and the entire inner periphery of the connection hole 64 to each other by laser welding. With such a configuration, the positive electrode current collector 60P and the positive electrode terminal member 100 are electrically connected with each other. Symbol "J" shown in FIG. 6 indicates a joint portion formed by laser welding.

An easy-to-break portion 65 is formed on the projecting portion 63 formed on the base portion 61 of the positive electrode current collector 60P. The easy-to-break portion 65 has a small plate thickness compared to other portions of the projecting portion 63, and forms a current cutoff mechanism in cooperation with the reverse film 110 of the positive electrode terminal member 100. The easy-to-break portion 65 is formed so as to surround a periphery of the connection hole 64, and has a closed loop shape.

As shown in FIG. 6, a lower surface of the reverse film 110 is positioned above a lower surface 120A of the outer plate 120. The lower surface of the reverse film 110 is also positioned above the lower surface 40A of the lid plate 40.

As shown in FIG. 6, a diameter size D1 of the reverse film 110 is set to a value equal to or smaller than a diameter size D2 of the hole edge portion of the first through hole 132 formed in the outer plate 120. The diameter size D1 of the reverse film 110 is also set to a value equal to or smaller than a diameter size D3 of a hole edge portion of the second through hole 45 formed in the lid plate 40. It is preferable that the diameter size D1 of the reverse film 110 be set to a value smaller than the diameter size D2 of the hole edge portion of the first through hole 132 formed in the outer plate 120. It is also preferable that the diameter size D1 of the reverse film 110 be set to a value smaller than the diameter size D3 of the hole edge portion of the second through hole 45 formed in the lid plate 40.

A thickness of the external connecting portion 101 in the direction in which the reverse film 110 is reversed (the direction indicated by an arrow F in FIG. 6) is set larger than a thickness of the reverse film 110.

2. Description of Manner of Operation of Current Cutoff Mechanism

The current cutoff mechanism is a mechanism which, when an internal pressure of a battery exceeds a predetermined value, cuts off an electric current which flows in the battery 10 thus suppressing the increase of an internal pressure of the battery. To be more specific, for example, when an internal pressure of a battery is increased and exceeds a predetermined value due to overcharge or the like of the battery, the reverse film 110 of the positive electrode terminal member 100 is, from a state where the reverse film 110 is in contact with the projecting portion 63 of the positive electrode current collector 60P, reversed by deforming a center portion of the reverse film 110 upward as indicated by the arrow F in FIG. 6. To be more specific, the reverse film 110 which bulges downward is reversed into a state where the reverse film 110 bulges upward. Then, along with the reversal of the reverse film 110, the easy-to-break portion 65 breaks so that electrical connection between the projecting portion 63 of the positive electrode current collector 60P and the reverse film 110 of the positive electrode terminal member 100 is disconnected. With such disconnection, an electric current which flows in the battery 10 can be cut off and hence, it is possible to prevent an internal pressure of the battery 10 from being increased to a predetermined value or more. An operation pressure (a pressure which allows reversal of the reverse film 110) on the current cutoff mechanism side is set to a numerical value smaller than a pressure at which the gas release vent 49 is operated. Accordingly, the current cutoff mechanism is operated before the gas release vent 49 is operated.

3. Description of Advantageous Effects

The battery 10 according to this embodiment includes: the positive electrode terminal member 100; the lid plate 40; the outer plate 120; and the positive electrode current collector 60P on which the easy-to-break portion 65 is formed. To be more specific, the battery 10 has the structure where the positive electrode current collector 60P is electrically connected to the positive electrode terminal member 100 fixed to the lid plate 40 in an insulation state and, further, the easy-to-break portion 65 which forms the current cutoff mechanism is formed on one of these two members 100, 60P (the positive electrode current collector 60P, for example). Accordingly, the current cutoff mechanism can be formed without providing a dedicated member such as a sealing lead in addition to the positive electrode terminal member 100 and hence, the number of parts can be reduced.

The positive electrode terminal member 100 is integrally formed with the lid plate 40 by the outer plate 120 which is an insulating synthetic resin member. With such a configuration, a gap formed between the second through hole 45 formed in the lid plate 40 and the positive electrode terminal member 100 is filled with a resin without forming a gap and hence, it is possible to maintain a gas tight state between the lid plate 40 and the positive electrode terminal member 100. At the same time, the lid plate 40 and the positive electrode terminal member 100 can be integrally formed with each other in an insulation state using a simple technique called integral molding.

In the battery 10, the inserting portion 105 formed on the positive electrode terminal member 100 is inserted into the cylindrical portion 131 of the outer plate 120. Accordingly, the positive electrode terminal member 100 can be firmly fixed to the outer plate 120 and the lid plate 40.

In the battery 10, the projecting portion 63 is formed on the base portion 61 of the positive electrode current collector 60P. The projecting portion 63 projects toward the reverse film 110 of the positive electrode terminal member 100 and hence, the reverse film 110 of the positive electrode terminal member 100 and the base portion 61 of the positive electrode current collector 60P can be easily connected to each other.

The base portion 61 of the positive electrode current collector 60P is fixed to the lid plate 40 by the rivet 150. Accordingly, it is possible to prevent a load of the energy storage element 20 from being concentrated on a connecting portion between the positive electrode terminal member 100 and the positive electrode current collector 60P (to be more specific, a connecting portion between the reverse film 110 and the projecting portion 63).

The rivet 150 can function as an auxiliary terminal. For example, when the easy-to-break portion 65 breaks with the battery 10 being in a charged state, a state is maintained where electrical energy is stored in the energy storage element 20 of the battery 10. In this case, by using the rivet 150 as a discharging auxiliary terminal, the electrical energy stored in the energy storage element 20 can be discharged to the outside of the battery 10.

The battery 10 also includes the positive electrode external terminal 170 which is connected to the external connecting portion 101 of the positive electrode terminal member 100. As a result, a shape of the positive electrode external terminal 170 can be designed as desired and hence, the degree of freedom in designing a structure for connecting the battery 10 and the external circuit to each other can be enhanced.

The lower surface of the reverse film 110 is positioned above the outer plate 120 or the lower surface 40A of the lid plate 40. Accordingly, a volume which the energy storage element 20 can occupy in an inner space (particularly in the height direction) of the battery 10 can be increased. As a result, a battery capacity of the battery 10 can be increased.

The diameter size D1 of the reverse film 110 is smaller than the diameter size D2 of the hole edge portion of the first through hole 132 formed in the outer plate 120 or the diameter size D3 of the hole edge portion of the second through hole 45 formed in the lid plate 40. As described above, by setting the diameter size D1 of the reverse film 110 smaller than the diameter size D2 of the hole edge portion of the first through hole 132 formed in the outer plate 120 or the diameter size D3 of the hole edge portion of the second through hole 45 formed in the lid plate 40, the reverse film 110 can be disposed in the vicinity of the first through hole 132 or the second through hole 45 in the height direction (vertical direction) of the battery 10. Accordingly, a volume which the energy storage element 20 can occupy in the inner space (particularly in the height direction) of the battery 10 can be increased and hence, a battery capacity of the battery 10 can be increased.

The diameter size D1 of the reverse film 110 is smaller than the diameter size D2 of the hole edge portion of the first through hole 132 or the diameter size D3 of the hole edge portion of the second through hole 45 and hence, the reverse film 110 can be arranged from an outer surface side of the lid plate 40. As a result, the degree of freedom in a step of assembling the reverse film 110 to the outer plate 120 or the lid plate 40 is increased. In this respect, JP-A-2012-230905 discloses a technique where a diameter size of a reverse film is set larger than a diameter size of a hole edge portion of a through hole formed in a lid. With such a configuration, in such a technique, the reverse film can be assembled only from an inner surface side of a lid plate and hence, the technique exhibits low operability and low manufacturing efficiency.

The thickness of the external connecting portion 101 in the reversing direction of the reverse film 110 (arrow F) is set larger than the thickness of the reverse film 110. With such a configuration, in performing insert molding of the reverse film 110 and the lid plate 40 using an insulating synthetic resin, the external connecting portion 101 can be used as a portion to be held by the die. Accordingly, it is unnecessary to hold the reverse film 110 having a relatively small wall thickness by the die and hence, it is possible to suppress the occurrence of a drawback such as deformation of the reverse film 110 at the time of performing insert molding.

Embodiment 2

Figure 12:
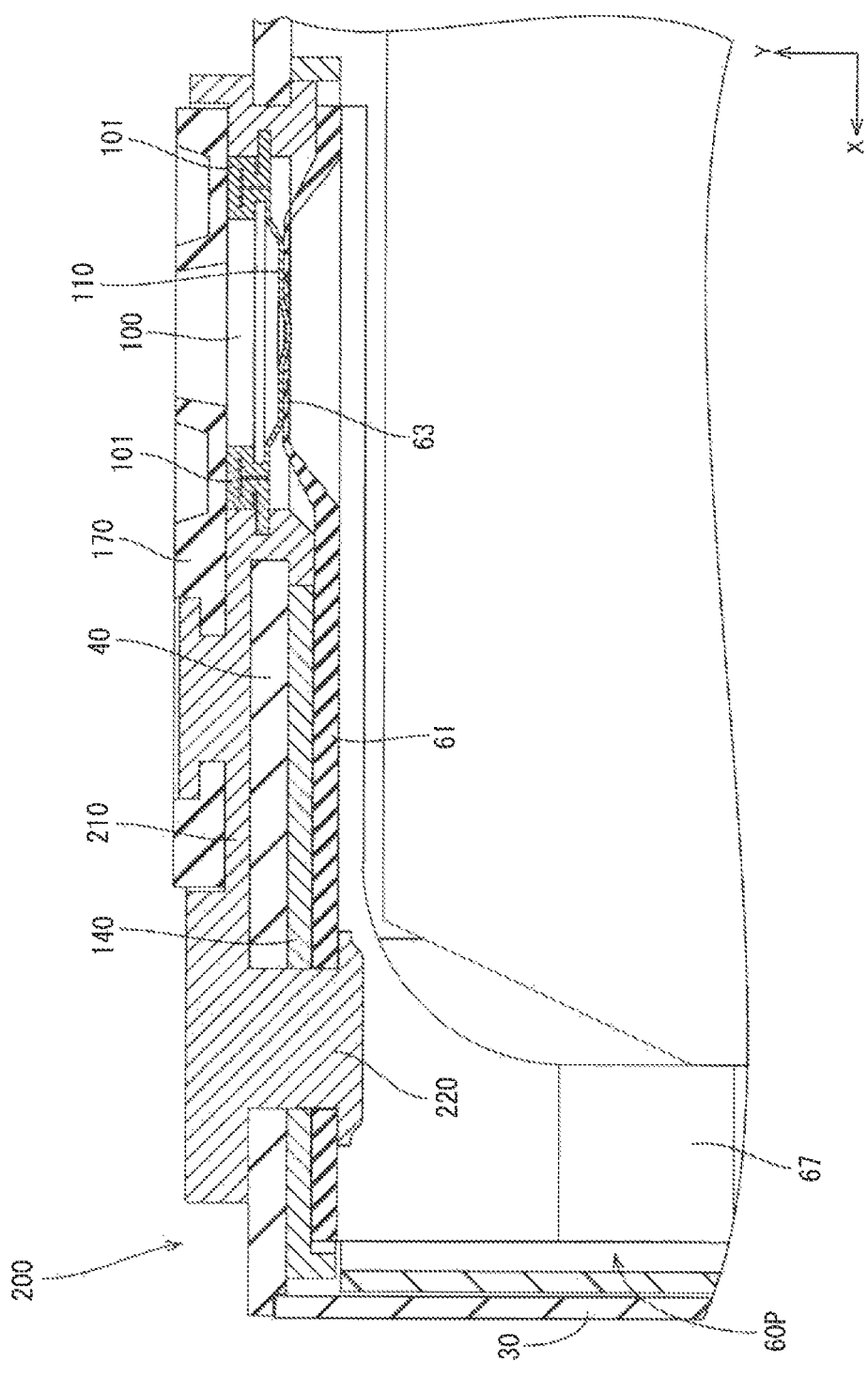
FIG. 12 is a cross-sectional view of a battery according to an embodiment 2 (showing a structure of a positive electrode terminal portion and an area around the positive electrode terminal portion).

Next, an embodiment 2 is described with reference to FIG. 12.

With respect to the battery 10 according to the embodiment 1, the case has been exemplified where the base portion 61 of the positive electrode current collector 60P is fixed to the lid plate 40 using the rivet 150. A battery 200 of the embodiment 2 differs from the battery 10 of the embodiment 1 with respect to a structure for fixing a base portion 61 to a lid plate 40. To be more specific, as shown in FIG. 12, in the battery 200 of the embodiment 2, a shaft portion 220 is integrally formed with an outer plate 210 disposed on an upper surface of the lid plate 40. The shaft portion 220 penetrates the lid plate 40, an inner plate 140, and a base portion 61 of a positive electrode current collector 60P in this order.

Figure 11:
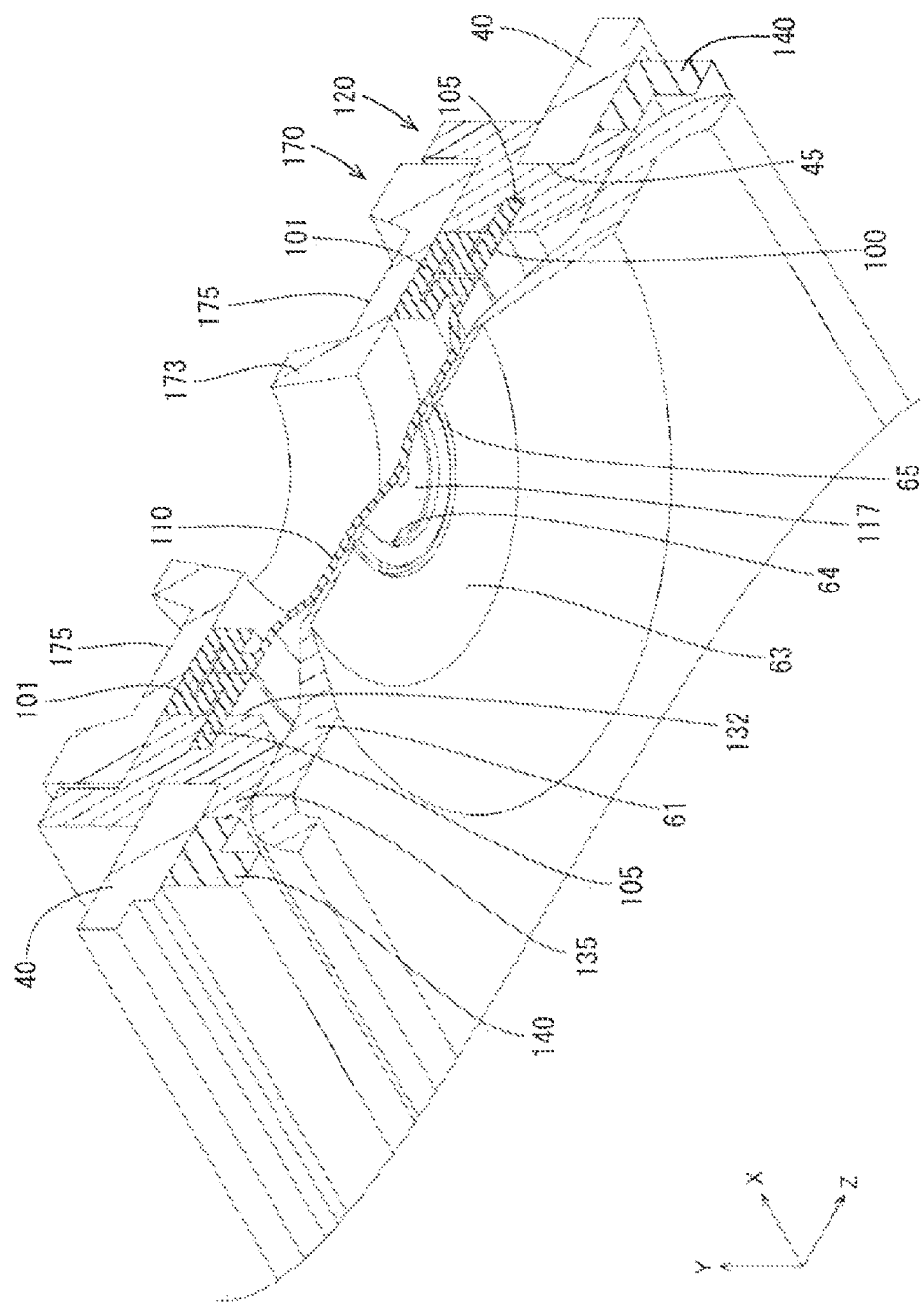
FIG. 11 is a cross-sectional perspective view of the lid plate with which the positive electrode terminal member is integrally formed using the outer plate made of a synthetic resin.

By thermally caulking the shaft portion 220, the base portion 61 of the positive electrode current collector 60P is fixed to the lower surface 40A of the lid plate 40 together with the inner plate 140. According to the battery 200 of the embodiment 2, the rivet 150 can be eliminated and hence, compared to the battery 10 of the embodiment 1, the number of parts can be reduced. In FIG. 11, parts identical to corresponding parts of the battery 10 are given the same reference symbols, and the description of the identical parts is omitted.

Embodiment 3

Figure 13:
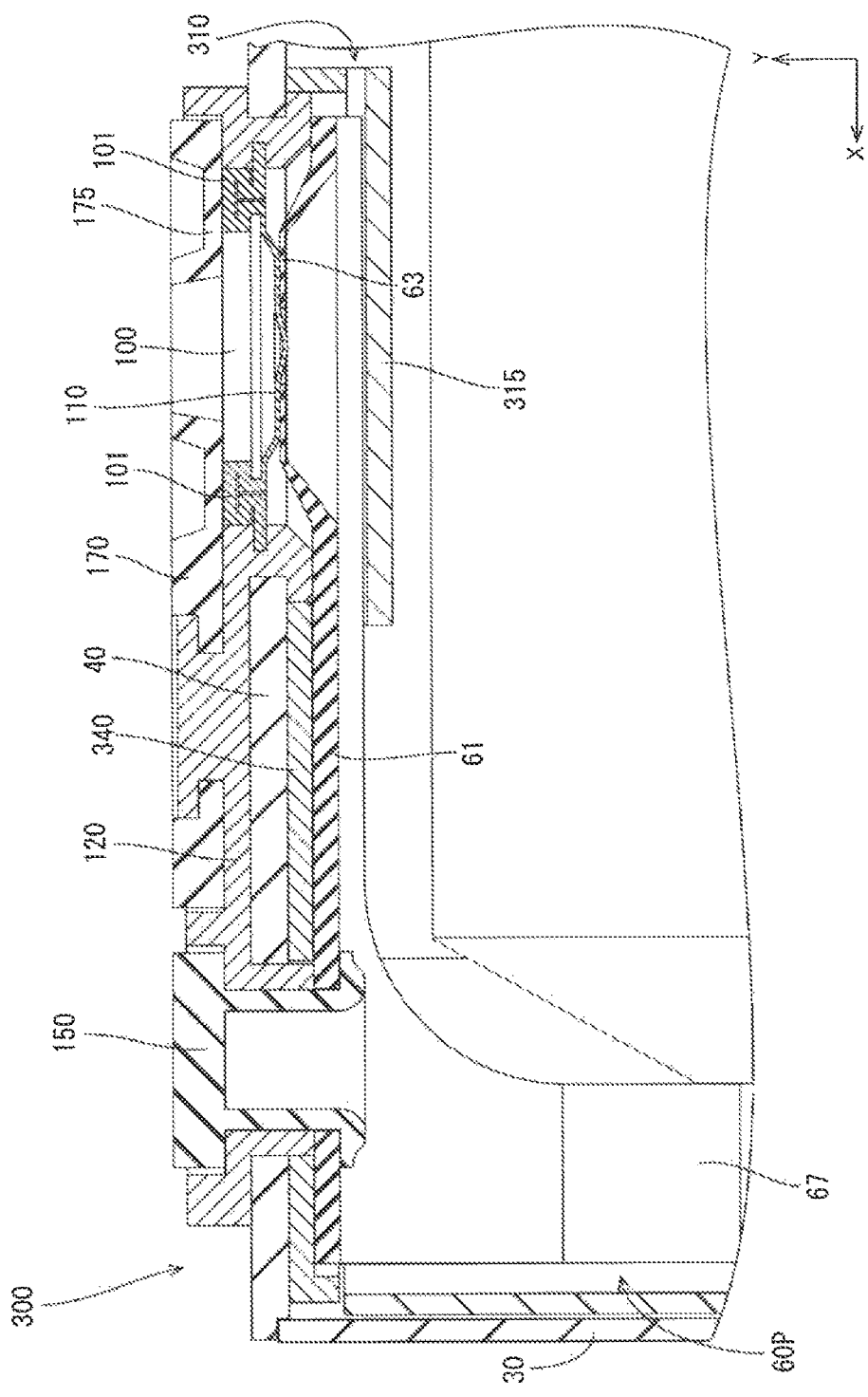
FIG. 13 is a cross-sectional view of a battery according to an embodiment 3 (showing a structure of a positive electrode terminal portion and an area around the positive electrode terminal portion).
Figure 14:
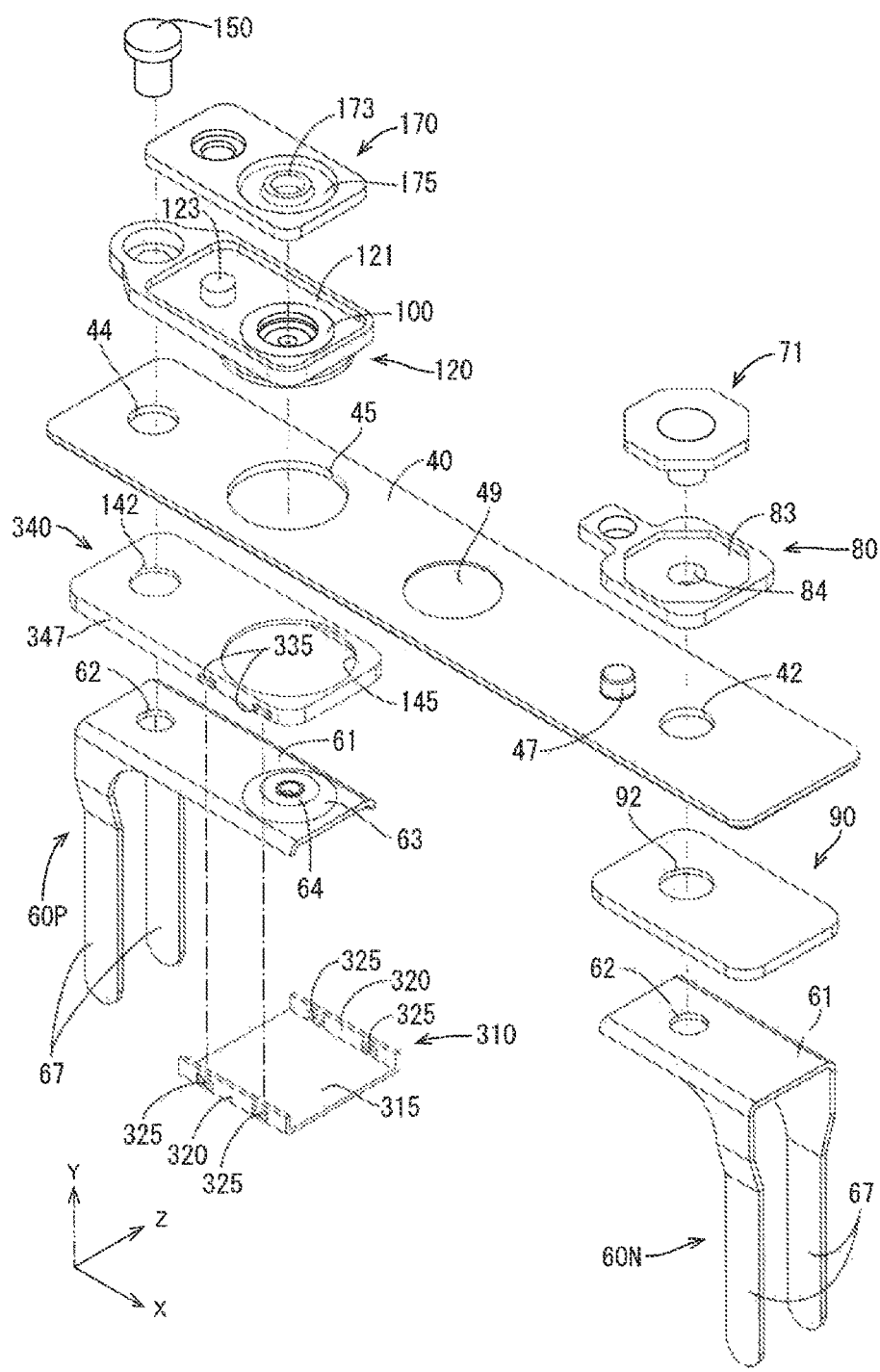
FIG. 14 is an exploded perspective view of a lid plate, a positive electrode terminal portion, a negative electrode terminal portion, and a cover.

Next, an embodiment 3 is described with reference to FIG. 12 and FIG. 13 and FIG. 14.

A battery 300 of the embodiment 3 differs from the battery 10 of the embodiment 1 with respect to a point that the battery 300 includes a cover 310. As shown in FIG. 13 and FIG. 14, the cover 310 has a bottom surface wall 315 and a pair of vertical walls 320. The vertical walls 320 are formed by being bent upward from both side edges of the bottom surface wall 315. Locking holes 325 are formed in each of the pair of vertical walls 320.

An inner plate 340 is disposed on a lower surface 40A of a lid plate 40. A flange 347 which is bent downward is formed on an outer peripheral portion of the inner plate 340, and surrounds a base portion 61 of a positive electrode current collector 60P. Locking pawls 335 are formed on an outer surface of the flange 347 corresponding to the locking holes 325 formed in the cover 310 side.

By having the respective locking pawls 335 locked to the respective locking holes 325, the cover 310 can be fixed to the inner plate 340. As shown in FIG. 13 and FIG. 14, the bottom surface wall 315 of the cover 310 covers a lower portion of the positive electrode terminal member 100. Accordingly, at the time of joining an external connecting portion 101 of the positive electrode terminal member 100 and a portion to be connected 175 of a positive electrode external terminal 170 to each other by laser welding, it is possible to prevent sputters from scattering into the inside of a casing 30. In FIG. 13 and FIG. 14, parts identical to corresponding parts of the battery 10 are given the same reference symbols, and the description of the identical parts is omitted.

Embodiment 4

Figure 15:
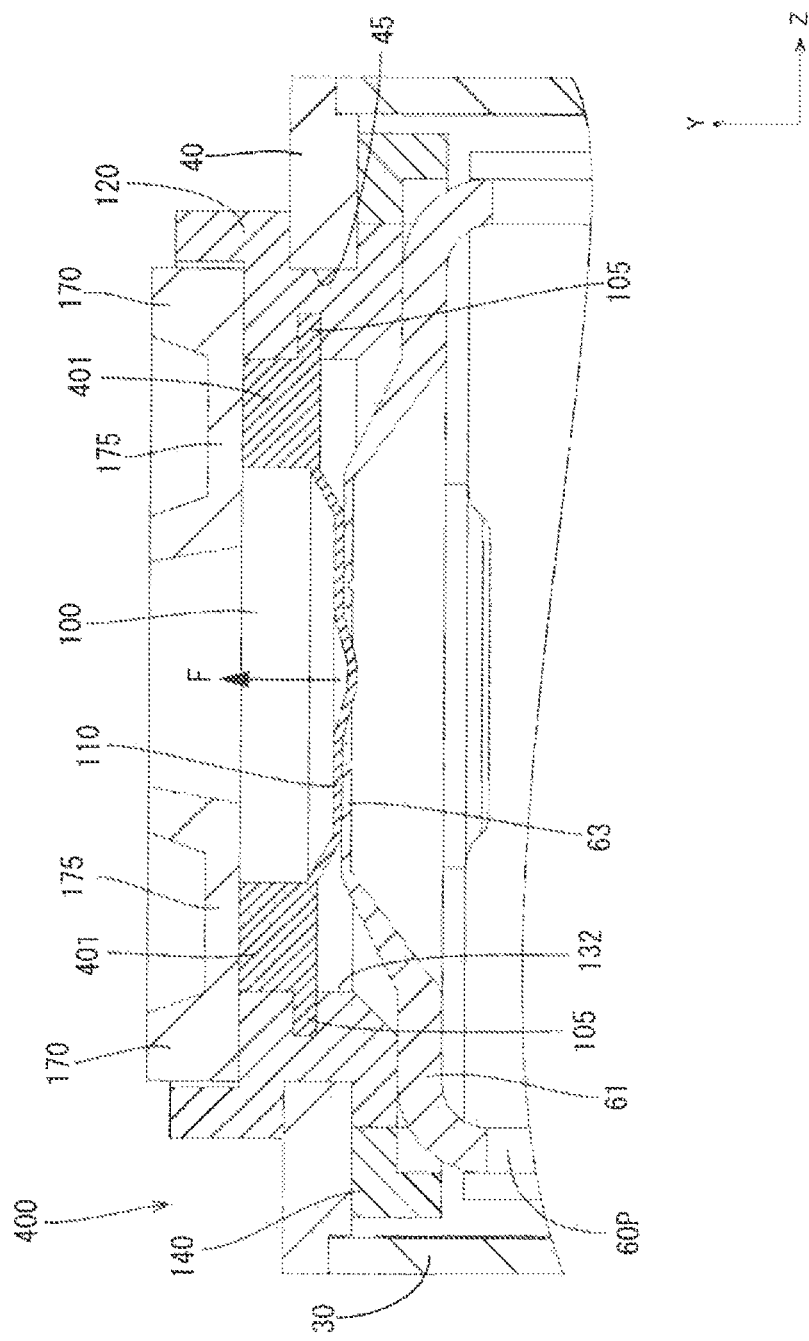
FIG. 15 is a cross-sectional view of a battery according to an embodiment 4 (showing a structure of a positive electrode terminal portion and an area around the positive electrode terminal portion).

Next, an embodiment 4 is described with reference to FIG. 15 and FIG. 16.

A battery 400 of the embodiment 4 differs from the battery 10 of the embodiment 1 with respect to a point that a thickness of an external connecting portion 401 in the reversing direction (arrow F) is set larger than a thickness of a reverse film 110. In the battery 10 of the embodiment 1, the external connecting portion 101 is formed by bending. However, bending is not applied in forming the external connecting portion 401 according to the embodiment 4.

Figure 16:
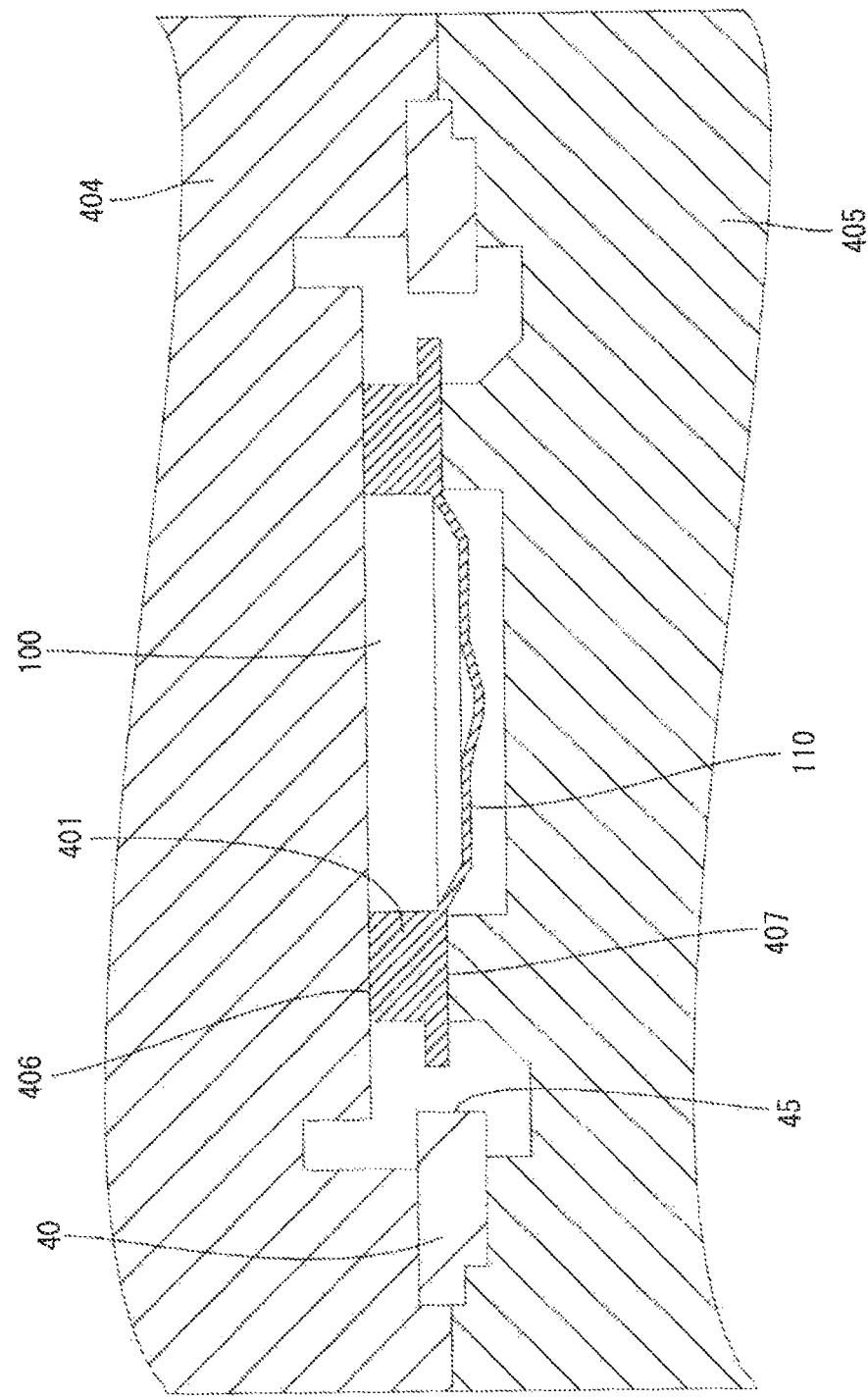
FIG. 16 is a cross-sectional view showing a step for forming the lid plate and the positive electrode terminal member by insert molding.

As shown in FIG. 16, in a step of performing insert molding using an insulating synthetic resin in a state where a positive electrode terminal member 403 and a lid plate 40 are held between a first die 404 positioned on an upper side and a second die 405 positioned on a lower side, an upper end portion of the external connecting portion 401 forms a first portion to be held 406 which is held by the first die 404, and a lower end portion of the external connecting portion 401 forms a second portion to be held 407 which is held by the second die 405. In this embodiment, the first portion to be held 406 forms a surface to be held (first surface to be held), and the second portion to be held 407 forms a surface to be held (second surface to be held).

Configurations other than the above-mentioned configuration are substantially equal to the corresponding configurations in the embodiment 1. Accordingly, identical constitutional members are given the same reference symbols, and the repeated description of such members is omitted.

According to this embodiment, at the time of joining a positive electrode external terminal 170 and the external connecting portion 401 to each other by laser welding, a weld depth of the external connecting portion 401 can be increased. Accordingly, the positive electrode external terminal 170 and the external connecting portion 401 can be firmly fixed to each other.

The external connecting portion 401 is formed with a relatively large wall thickness. Accordingly, at the time of performing insert molding, the external connecting portion 401 can be used as the first portion to be held 406 which is held by the first die 404 and can also be used as the second portion to be held 407 which is held by the second die 405. With such a configuration, it is unnecessary to hold the reverse film 110 having a relatively small wall thickness and hence, a defect such as deformation of the reverse film 110 can be suppressed.

Embodiment 5

Figure 17:
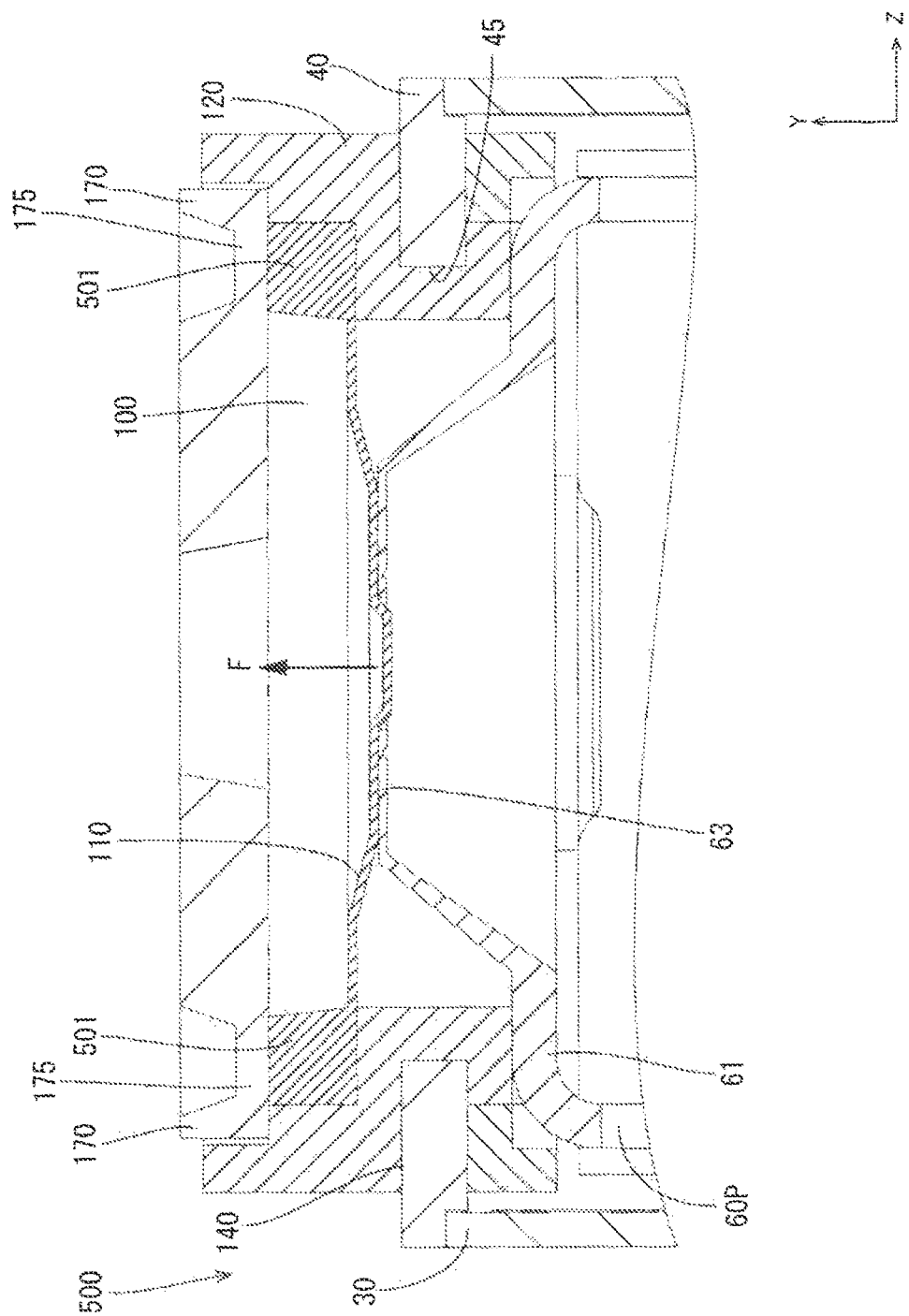
FIG. 17 is a cross-sectional view of a battery according to an embodiment 5 (showing a structure of a positive electrode terminal portion and an area around the positive electrode terminal portion).

Next, an embodiment 5 is described with reference to FIG. 17.

In a battery 500 of the embodiment 5, a thickness of an external connecting portion 501 is set larger than a thickness of a reverse film 110.

An external connecting portion 501 is disposed at a position above a lid plate 40. In other words, an outer diameter size of the external connecting portion 501 is increased. The external connecting portion 501 is connected to a positive electrode external terminal 170.

Configurations other than the above-mentioned configuration are substantially equal to the corresponding configurations in the embodiment 1. Accordingly, identical constitutional members are given the same reference symbols, and repeated description of such members is omitted.

According to this embodiment, it is possible to ensure a large connection region between the external connecting portion 501 and the positive electrode external terminal 502. With such a configuration, it is possible to reduce electric resistance between the external connecting portion 501 and the positive electrode external terminal 502.

The connection region between the external connecting portion 501 and the positive electrode external terminal 502 is increased and hence, heat generated by the battery 500 can be rapidly transferred to the positive electrode external terminal 502 from the external connecting portion 501. Accordingly, heat radiation performance of the battery 500 can be enhanced.

Embodiment 6

Figure 18:
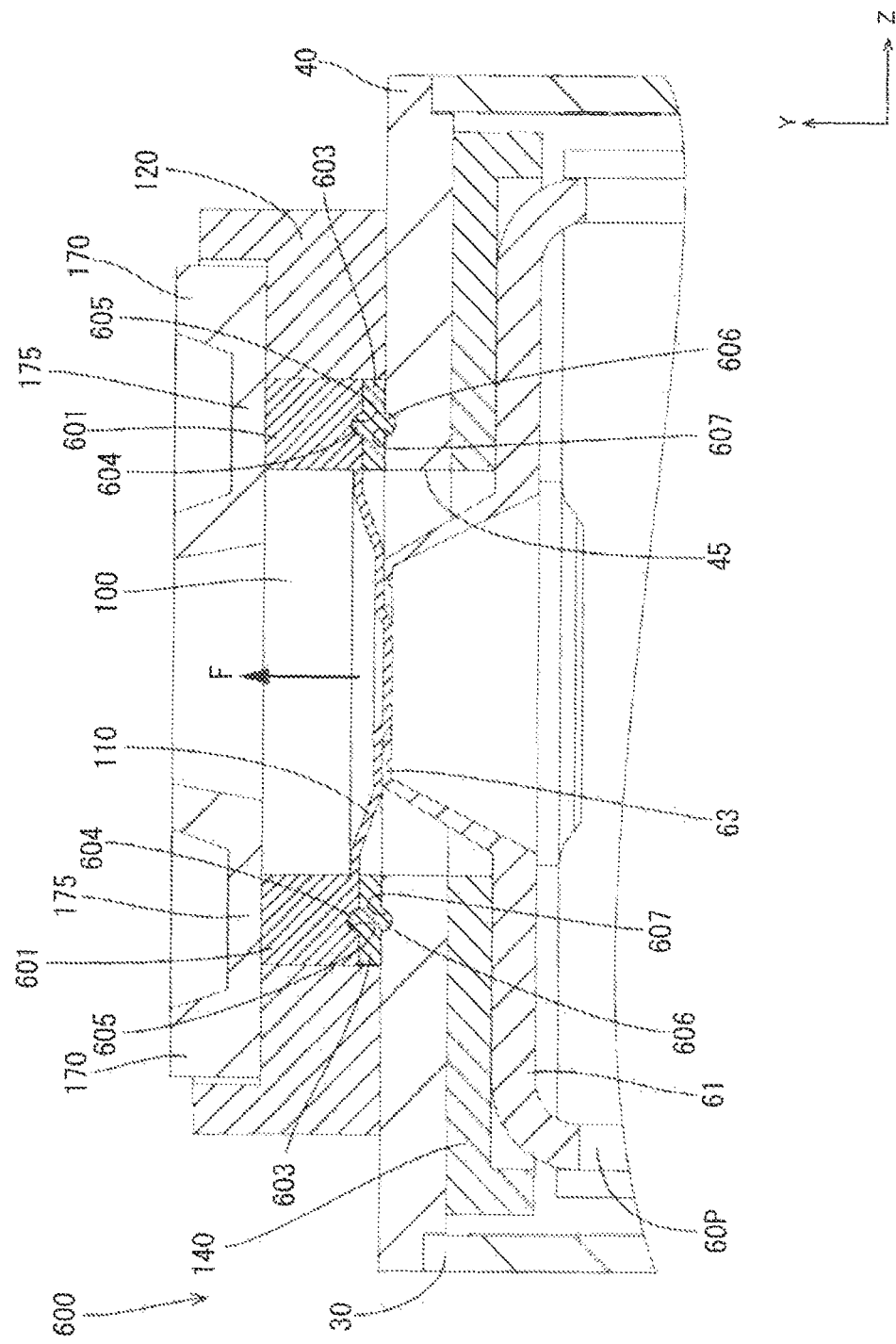
FIG. 18 is a cross-sectional view of a battery according to an embodiment 6 (showing a structure of a positive electrode terminal portion and an area around the positive electrode terminal portion).

Next, an embodiment 6 is described with reference to FIG. 18.

In a battery 600 of the embodiment 6, a thickness of an external connecting portion 601 is set larger than a thickness of a reverse film 110.

The external connecting portion 601 is disposed at a position above a lid plate 40. A second insulating member 603 made of an insulating synthetic resin is disposed between the external connecting portion 601 and the lid plate 40 in the form of a substantially ring shape.

An upper rib 604 which projects upward is formed on an upper surface of the second insulating member 603. The upper rib 604 is continuously formed over the entire circumference of the second insulating member 603 without cuts. An upper groove 605 into which the upper rib 604 is fitted is formed on a lower surface of the external connecting portion 601 such that the upper groove 605 is recessed upward.

A lower rib 606 which projects downward is formed on a lower surface of the second insulating member 603. The lower rib 606 is continuously formed over the entire circumference of the second insulating member 603 without cuts. A lower groove 607 into which the lower rib 606 is fitted is formed on the upper surface of the lid plate 40 such that lower groove 607 is recessed downward.

The upper surface of the second insulating member 603 excluding the upper rib 604 is formed of a flat surface. The lower surface of the second insulating member 603 excluding the lower rib 606 is also formed of a flat surface.

Configurations other than the above-mentioned configuration are substantially equal to the corresponding configurations in the embodiment 1. Accordingly, the identical constitutional members are given the same reference symbols, and repeated description of such members is omitted.

According to this embodiment, a diameter size of a hole edge portion of a second through hole 45 formed in the lid plate 40 can e reduced. Accordingly, strength of the lid plate 40 can be enhanced.

The upper rib 604 is fitted in the upper groove 605 and the lower rib 606 is fitted in the lower groove 607 and hence, assembly strength between the lid plate 40, the second insulating member 603, and the external connecting portion 601 can be enhanced.

Further, the external connecting portion 601 can be easily disposed above the lid plate 40.

It is unnecessary to make a die for molding the outer plate 120 by insert molding have a complicated shape.

Even when a diameter size D1 of a reverse film 110 is set larger than a diameter size D3 of a hole edge portion of a second through hole 45, a lower surface of the reverse film 110 can be positioned above a lower surface 40A of the lid plate 40 or a lower surface of an outer plate 120. With such a configuration, in an inner space of the battery 10 (particularly in the height direction), a volume which the energy storage element 20 can occupy can be increased and hence, a battery capacity of the battery 10 can be increased.

Modification of Embodiment 6

As a modification of the embodiment 6, the hole edge portion of the second through hole 45 formed in the lid plate 40 may have a shape where a diameter of the hole edge portion is made narrower than a diameter of the external connecting portion 601 in a radially inward direction. With such a configuration, a diameter of the reverse film 110 can be set further larger than the diameter of the hole edge portion of the second through hole 45.

For example, in a thin-type battery 600 where a diameter size D3 of the hole edge portion of the second through hole 45 cannot be set large, a diameter size D1 of a reverse film 110 can be increased by a desired amount.

Embodiment 7

Figure 19:
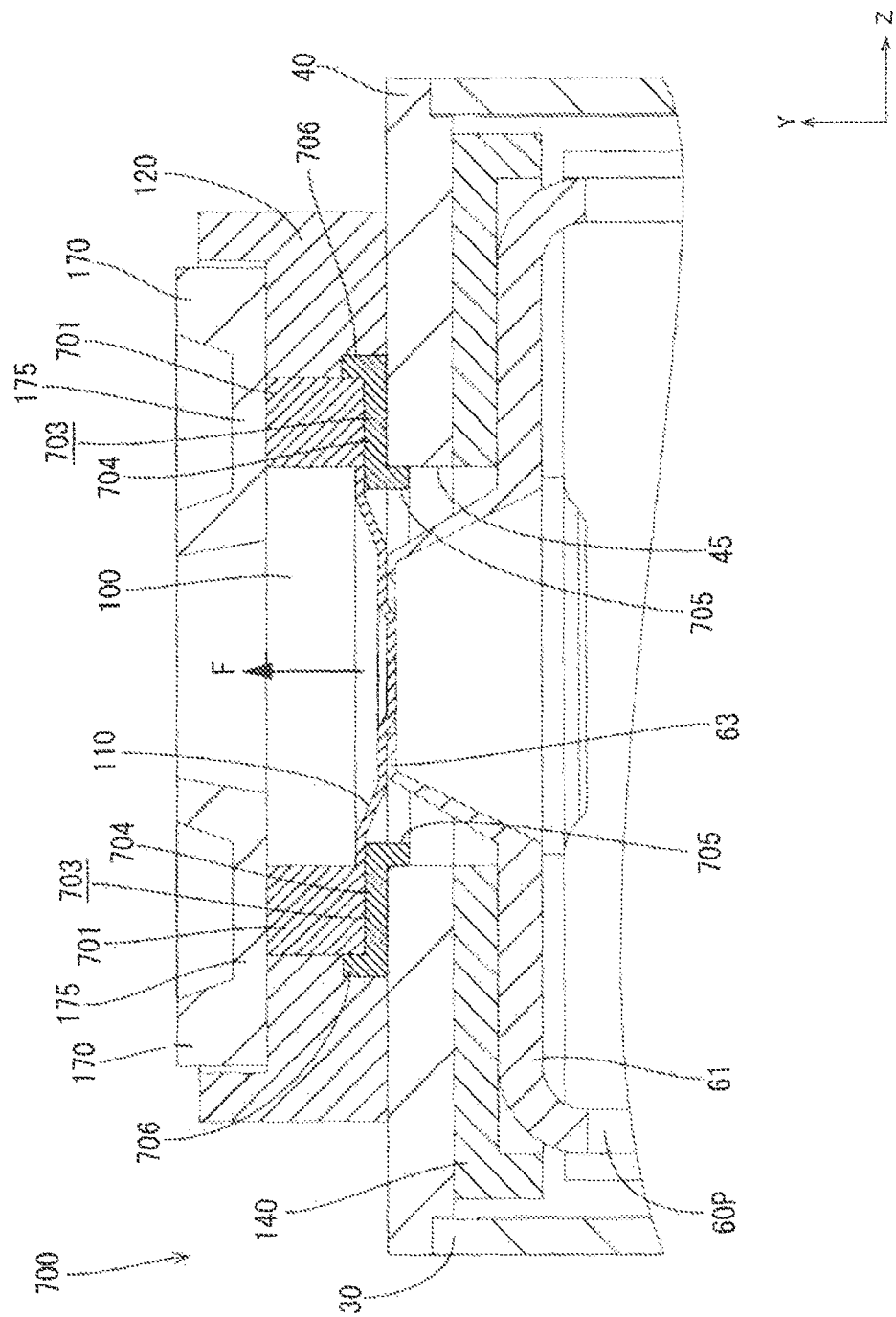
FIG. 19 is a cross-sectional view of a battery according to an embodiment 7 (showing a structure of a positive electrode terminal portion and an area around the positive electrode terminal portion).

Next, an embodiment 7 is described with reference to FIG. 19.

In a battery 700 of the embodiment 7, a thickness of an external connecting portion 701 is set larger than a thickness of a reverse film 110.

The external connecting portion 701 is disposed at a position above a lid plate 40. A second insulating member 703 made of an insulating synthetic resin is disposed between the external connecting portion 701 and the lid plate 40.

As viewed in a top plan view, the second insulating member 703 is formed into a substantially ring shape. The second insulating member 703 includes: a plate-like body portion 704 disposed on an upper surface of the lid plate 40; a lower rib 705 extending downward from an inner edge of the body portion 704; and an upper rib 706 extending upward from an outer edge of the body portion 704.

An upper surface and a lower surface of the body portion 704 are respectively formed of a flat surface. The lower rib 705 covers an upper ridge portion of a hole edge portion of a second through hole 45 formed in the lid plate 40. The upper rib 706 covers a portion of a lower end edge of the external connecting portion 701 which is positioned on an outer peripheral side.

Configurations other than the above-mentioned configuration are substantially equal to the corresponding configurations in the embodiment 1. Accordingly, the same constitutional members are given the same reference symbols, and repeated description of such members is omitted.

According to this embodiment, due to the formation of the lower rib 705, a long creepage distance can be ensured between the hole edge portion of the second through hole 45 formed in the lid plate 40 and the external connecting portion 701. Accordingly, insulating property between the lid plate 40 and the external connecting portion 701 can be enhanced.

Due to the formation of the upper rib 706, a long creepage distance can be ensured, between a portion of a lower end edge of the external connecting portion 701 positioned on an outer peripheral side and the lid plate 40. Accordingly, insulating property between the lid plate 40 and the external connecting portion 701 can be enhanced.

Other Embodiments

The technique disclosed in this specification is not limited to the embodiments described with reference to the above-mentioned description and the drawings. For example, the following embodiments also fall within the technical scope of the present invention.

(1) In the embodiment, the lithium ion secondary battery has been taken as one example of the energy storage device. However, the technique disclosed in this specification is applicable to any energy storage device provided that the energy storage device includes: the casing 30; the energy storage element 20; the lid plate 40; the terminal members 71, 100; and the current collectors 60P, 60N. The technique is also applicable to other batteries besides lithium ion secondary batteries, and capacitors such as electric double layer capacitors.

(2) In the embodiment, the easy-to-break portion 65 which breaks due to the reversal of the reverse film 110 has been exemplified. However, it is sufficient for "easy-to-break portion" that the easy-to-break portion can cut off electrical connection between the positive electrode terminal member 100 and the positive electrode current collector 60P by breaking when an abnormal state occurs in the battery 10. For example, the easy-to-break portion may be formed of a fuse which is fused when a large electric current exceeding an allowable value flows through the fuse. It is sufficient for the "easy-to-break portion" that the easy-to-break portion is formed on at least either one of the positive electrode terminal member 100 or the positive electrode current collector 60P. The easy-to-break portion may be formed on the positive electrode terminal member 100 side.

(3) In the embodiment, the example has been described where the current cutoff mechanism formed of the reverse film 110 and the easy-to-break portion 65 is formed on the positive electrode side. However, the current cutoff mechanism may be formed on the negative electrode side.

(4) In the embodiment, the example has been described where the external terminal is connected to the external connecting portion. However, a conductive member such as a bus bar may be directly connected to the external connecting portion.

(5) The rivet 150 may be omitted. In this case, the inner plate 140 may also be omitted. However, by making the folded back portion 135 of the outer plate 120 surround the hole edge of the second through hole 45 and extend toward the outside in the radial direction of the second through hole 45 along the lower surface 40A of the lid plate 40, the positive electrode current collector 60P can be easily disposed. Accordingly, it is preferable to adopt such a configuration. In the case where the rivet 150 is omitted, by adopting the configuration where the energy storage element 20 is held by bringing the energy storage element 20 into contact with an inner surface of the bottom surface wall 35 of the casing 30, the weight of the energy storage element 20 is not applied to the reverse film 110. Accordingly, it is preferable to adopt such a configuration.

(6) To allow a gas to easily flow into a portion where the reverse film 110 is disposed when a pressure in the casing 30 is increased, a groove which communicates with the reverse film 110 and guides the gas to the reverse film 110 may be formed on the inner plate 140 and/or the outer plate 120.

(7) To allow a gas to easily flow into a portion where the reverse film 110 is disposed when a pressure in the casing 30 is increased, a through hole may be formed in the base portion 61 of the positive electrode current collector 60P and/or the projecting portion 63.

(8) The second insulating member may be formed of a so-called O-ring.

(9) In the embodiment 1, the reverse film 110, the first through hole 132, and the second through hole 45 respectively have a circular shape as viewed in a top plan view. However, shapes of these components are not limited to a circular shape. As viewed in a top plan view, the reverse film 110 may not have a circular shape, the first through hole 132 may not have a circular shape, and the second through hole 45 may not have a circular shape. The reverse film 110, the first through hole 132, and the second through hole 45 may have a desired shape such as an elongated circular shape or a rectangular shape according to necessity.

(10) As viewed in a top plan view, a profile shape of the reverse film 110 may be smaller than a shape of the hole edge portion of the first through hole 132 or a shape of the hole edge portion of the second through hole 45. In other words, as viewed in a top plan view, the reverse film 110 may have a profile shape which allows the reverse film 110 to pass through the first through hole 132 or the second through hole 45.

DESCRIPTION OF REFERENCE SIGNS 10, 200, 300, 400, 500, 600, 700: battery
20: energy storage element
30: casing
40: lid plate
40A: lower surface of lid plate
45: second through hole
60P, 60N: positive electrode current collector, negative electrode current collector
61: base portion
63: projecting portion
64: connection hole
65: easy-to-break portion
70P, 70N: positive electrode terminal portion, negative electrode terminal portion
100, 403: positive electrode terminal member
101, 401, 501, 601, 701: external connecting portion
110: reverse film
117: boss
120, 210: outer plate (one example of first insulating member)
120A: lower surface of outer plate
132: first through hole
140: inner plate
150: rivet
170, 502: positive electrode external terminal lone example of external terminal)
404: first die
405: second die
406: first portion to be held
407: second portion to be held
603, 703: second insulating member
D1: diameter size of reverse film D2: diameter size of hole edge portion of first through hole D3: diameter size of hole edge portion of second through hole

The invention claimed is:

1. An energy storage device, comprising:
a casing having an opening;
an energy storage element housed in the casing;
a lid plate mounted in the opening of the casing;
a terminal member integrally fixed to, and insulated from, the lid plate by an insulating synthetic resin; and
a current collector configured to electrically connect the energy storage element and the terminal member to each other,
wherein a breakable portion is formed on at least one of the terminal member and the current collector,
wherein a first insulating member, including the insulating synthetic resin, is interposed between the lid plate and the terminal member, and
wherein the terminal member includes:
an external connecting portion electrically connected to an external circuit;
a film which projects downward, in a direction opposite to a direction that the terminal member projects from the lid plate, from a bottom surface of the external connecting portion; and
an inserting portion which is inserted into an inside of the first insulating member.

2. The energy storage device according to claim 1, wherein
the inserting portion extends from the external connecting portion, in a direction parallel to the lid plate, to be inserted into the inside of the first insulating member.

3. The energy storage device according to claim 1, wherein
the film comprises a metal-made reverse film which is defaulted when a pressure in the casing is increased, and
wherein the breakable portion is formed on the current collector such that the breakable portion breaks due to a deformation of the metal-made reverse film.

4. The energy storage device according to claim 3, wherein the current collector includes:
a base portion disposed on a lower surface of the lid plate; and
a projecting portion disposed on the base portion, projecting toward the metal-made reverse film, and connected to the metal-made reverse film, and
wherein the breakable portion forms a part of the projecting portion.

5. The energy storage device according to claim 3, wherein the first insulating member is interposed between the lid plate and the terminal member, and a lower surface of the metal-made reverse film is positioned above a lower surface of the first insulating member or the lid plate.

6. The energy storage device according to claim 3, wherein the first insulating member is interposed between the lid plate and the terminal member,
wherein a first through hole is formed in the first insulating member such that the first through hole penetrates the first insulating member,
wherein, a second through hole is formed in the lid plate coaxially with the first through hole such that the second through hole penetrates the lid plate,
wherein the metal-made reverse film has a disk shape, and wherein a diameter size of the metal-made reverse film is set equal to or smaller than a diameter size of a hole edge portion of the first through hole or the second through hole.

7. The energy storage device according to claim 3, wherein a second insulating member comprising an insulating synthetic resin is disposed between the external connecting portion of the terminal member and the lid plate.

8. The energy storage device according to claim 4, wherein the current collector includes:
a base portion disposed on a lower surface of the lid plate; and
a projecting portion disposed on the base portion, projecting toward the metal-made reverse film, and connected to the metal-made reverse film, and
wherein the base portion is fixed to the lid plate.

9. The energy storage device according to claim 4, further comprising an external terminal connected to the external connecting portion of the terminal member.

10. An energy storage device, comprising:
a casing having an opening;
an energy storage element housed in the casing;
a lid plate mounted in the opening of the casing;
a terminal member integrally fixed to, and insulated from, the lid plate by an insulating synthetic resin; and
a current collector configured to electrically connect the energy storage element and the terminal members to each other,
wherein the terminal member includes:
a metal-made reverse film which is deformed when a pressure in the casing is increased; and
an external connecting portion electrically connected to an external circuit,
wherein the current collector includes a breakable portion configured to be broken due to a deformation of the metal-made reverse film,
wherein a thickness of the external connecting portion is set larger than a thickness of the metal-made reverse film in a reversing direction in which the metal-made reverse film is reversed due to the deformation of the metal-made reverse film, and
wherein the metal-made reverse film projects downward, in a direction opposite to a direction that the terminal member projects from the lid plate, from a bottom surface of the external connecting portion.

11. The energy storage device according to claim 1, wherein the first insulating member comprises a recess extending in a direction parallel to the lid plate.

12. The energy storage device according to claim 11, wherein the insertion portion penetrates into the recess of the first insulating member to extends inside the first insulating member in the direction parallel to the lid plate.

13. The energy storage device according to claim 12, wherein, in a cross-sectional view, the first insulating member contacts an upper surface of the insertion portion, a side surface of the insertion portion, and a bottom surface of the insertion portion.

14. The energy storage device according to claim 11, wherein the insertion portion penetrates into the recess of the first insulating member, such that, in a cross-sectional view, the first insulating member abuts three surfaces of the insertion portion.

15. The energy storage device according to claim 1, wherein, when a pressure in the casing is increased, the film, which bulges downward, deforms to reverse into a state where the reverse film bulges upward.

16. The energy storage device according to claim 10, wherein the terminal member further includes an insertion portion that penetrates into a recess of a insulating member that is interposed between the lid plate and the terminal member, and wherein the insertion portion extends inside the insulating member in a direction parallel to the lid plate, such that, in a cross-sectional view, the insulating member abuts three surfaces of the insertion portion.

* * * * *